(12) United States Patent
Azarafrooz et al.

(10) Patent No.: US 11,438,377 B1
(45) Date of Patent: Sep. 6, 2022

(54) MACHINE LEARNING-BASED SYSTEMS AND METHODS OF USING URLS AND HTML ENCODINGS FOR DETECTING PHISHING WEBSITES

(71) Applicant: Netskope, Inc., Santa Clara, CA (US)

(72) Inventors: Ari Azarafrooz, Rancho Santa Margarita, CA (US); Najmeh Miramirkhani, Santa Clara, CA (US); Zhi Xu, Cupertino, CA (US); Yihua Liao, Fremont, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/475,230

(22) Filed: Sep. 14, 2021

(51) Int. Cl.
| | | |
|---|---|---|
| *H04L 9/40* | (2022.01) | |
| *G06K 9/62* | (2022.01) | |
| *G06F 16/955* | (2019.01) | |
| *G06N 3/08* | (2006.01) | |

(52) U.S. Cl.
CPC ...... *H04L 63/1483* (2013.01); *G06F 16/9566* (2019.01); *G06K 9/628* (2013.01); *G06K 9/6256* (2013.01); *G06N 3/08* (2013.01)

(58) Field of Classification Search
CPC ............ H04L 63/1483; G06F 16/9566; G06K 9/6256; G06K 9/628; G06N 3/08
USPC ........................................................ 726/22
See application file for complete search history.

(56) References Cited

U.S. PATENT DOCUMENTS

| | | |
|---|---|---|
| 6,574,655 B1 | 6/2003 | Libert et al. |
| 6,829,654 B1 | 12/2004 | Jungck |
| 7,743,003 B1 | 6/2010 | Tong et al. |
| 7,996,373 B1 | 8/2011 | Zoppas et al. |
| 8,127,365 B1 | 2/2012 | Liu et al. |
| 8,130,747 B2 | 3/2012 | Li et al. |

(Continued)

FOREIGN PATENT DOCUMENTS

| | | |
|---|---|---|
| CN | 110647895 A | 1/2020 |
| CN | 110647896 A | 1/2020 |

(Continued)

OTHER PUBLICATIONS

U.S. Appl. No. 17/475,236, filed Sep. 14, 2021, Pending.

(Continued)

*Primary Examiner* — Badri Narayanan Champakesan
(74) *Attorney, Agent, or Firm* — Haynes Beffel & Wolfeld, LLP; Ernest J. Beffel, Jr.

(57) ABSTRACT

Disclosed is classifying a URL and a content page accessed via the URL as phishing or not. URL embedder extracts characters in a predetermined set from the URL to produce a character string trained using ground truth classification of the URL, producing a URL embedding. HTML parser accesses content at the URL and extracts HTML tokens from the content page. Further, HTML encoder, trained on HTML tokens extracted from content pages at example URLs, each example URL accompanied by a ground truth image captured from the content page accessed via the example URL, produces an HTML encoding of the tokens extracted from the page. Also, phishing classifier layers, trained on the URL embedding and the HTML encoding of example URLs, processes a concatenated input of the URL embedding and the HTML encoding to produce a likelihood score that the URL and content accessed via the URL presents a phishing risk.

20 Claims, 17 Drawing Sheets

(56) References Cited

U.S. PATENT DOCUMENTS

| | | | |
|---|---|---|---|
| 8,438,630 B1 | 5/2013 | Clifford | |
| 8,776,249 B1 | 7/2014 | Margolin | |
| 9,069,992 B1 | 6/2015 | Vaikar et al. | |
| 9,185,095 B1 | 11/2015 | Moritz et al. | |
| 9,275,345 B1 | 3/2016 | Song et al. | |
| 9,338,187 B1 | 5/2016 | Oprea et al. | |
| 9,350,757 B1 | 5/2016 | Falkowitz et al. | |
| 9,413,774 B1 | 8/2016 | Liu et al. | |
| 10,162,767 B2 | 12/2018 | Spurlock et al. | |
| 10,291,657 B2 | 5/2019 | Narayanaswamy et al. | |
| 10,349,304 B2 | 7/2019 | Kim et al. | |
| 10,404,755 B2 | 9/2019 | Narayanaswamy et al. | |
| 10,404,756 B2 | 9/2019 | Narayanaswamy et al. | |
| 10,594,730 B1 | 3/2020 | Summers et al. | |
| 10,803,140 B1* | 10/2020 | Morris | H04L 67/025 |
| 2005/0289354 A1 | 12/2005 | Borthakur et al. | |
| 2007/0245420 A1 | 10/2007 | Yong et al. | |
| 2008/0072140 A1* | 3/2008 | Vydiswaran | G06F 40/194 |
| | | | 715/243 |
| 2008/0127303 A1 | 5/2008 | Wrighton et al. | |
| 2008/0216174 A1 | 9/2008 | Vogel et al. | |
| 2009/0125529 A1* | 5/2009 | Vydiswaran | G06F 16/951 |
| 2010/0146269 A1 | 6/2010 | Baskaran | |
| 2010/0169311 A1* | 7/2010 | Tengu | G06F 16/951 |
| | | | 707/E17.108 |
| 2011/0047590 A1 | 2/2011 | Carr et al. | |
| 2011/0131408 A1 | 6/2011 | Cook et al. | |
| 2011/0252475 A1* | 10/2011 | Mui | H04L 63/1483 |
| | | | 726/23 |
| 2011/0276828 A1 | 11/2011 | Tamaki et al. | |
| 2013/0254885 A1 | 9/2013 | Devost | |
| 2014/0026182 A1 | 1/2014 | Pearl et al. | |
| 2014/0283033 A1* | 9/2014 | Anand | H04L 63/1441 |
| | | | 726/22 |
| 2014/0283139 A1* | 9/2014 | Anand | G06F 21/54 |
| | | | 726/30 |
| 2015/0067845 A1 | 3/2015 | Chari et al. | |
| 2015/0271207 A1 | 9/2015 | Jaiswal et al. | |
| 2016/0269467 A1 | 9/2016 | Lee et al. | |
| 2016/0275577 A1 | 9/2016 | Sesha et al. | |
| 2016/0277374 A1 | 9/2016 | Reid et al. | |
| 2016/0285918 A1 | 9/2016 | Peretz et al. | |
| 2016/0292445 A1 | 10/2016 | Lindemann | |
| 2017/0039633 A1* | 2/2017 | Yenisetty | G06Q 30/08 |
| 2017/0063720 A1 | 3/2017 | Foskett et al. | |
| 2017/0091482 A1 | 3/2017 | Sarin et al. | |
| 2017/0116416 A1 | 4/2017 | Pearcy et al. | |
| 2017/0264640 A1 | 9/2017 | Narayanaswamy et al. | |
| 2018/0063182 A1 | 3/2018 | Jones et al. | |
| 2018/0183820 A1 | 6/2018 | Iyer et al. | |
| 2018/0324204 A1 | 11/2018 | McClory et al. | |
| 2019/0014149 A1 | 1/2019 | Cleveland et al. | |
| 2019/0044967 A1 | 2/2019 | Sukhomlinov et al. | |
| 2020/0137110 A1 | 4/2020 | Tyler et al. | |
| 2020/0162484 A1* | 5/2020 | Solis Agea | H04L 63/1416 |
| 2020/0204572 A1 | 6/2020 | Jeyakumar et al. | |
| 2020/0351300 A1 | 11/2020 | Kaidi | |
| 2020/0372040 A1 | 11/2020 | Boehmann et al. | |
| 2021/0240825 A1* | 8/2021 | Kutt | G06F 8/42 |
| 2021/0240826 A1* | 8/2021 | Kutt | G06V 10/82 |
| 2021/0344693 A1* | 11/2021 | Azad | H04L 63/1416 |
| 2021/0385232 A1* | 12/2021 | Kutt | G06N 3/04 |
| 2022/0036208 A1* | 2/2022 | Rao | G06N 5/04 |
| 2022/0046057 A1* | 2/2022 | Kutt | H04L 63/145 |

FOREIGN PATENT DOCUMENTS

| | | |
|---|---|---|
| JP | 2012084141 A | 4/2012 |
| JP | 2015130112 A | 7/2015 |
| WO | 2006109187 A2 | 10/2006 |
| WO | 2007009255 A1 | 1/2007 |
| WO | 2008017008 A2 | 2/2008 |
| WO | 2009094654 A1 | 7/2009 |
| WO | 2012058487 A2 | 5/2012 |
| WO | 2017044432 A1 | 3/2017 |
| WO | 2019226363 A1 | 11/2019 |

OTHER PUBLICATIONS

U.S. Appl. No. 17/475,233, filed Sep. 14, 2021, Pending.
U.S. Appl. No. 17/154,978, filed Jan. 21, 2021, U.S. Pat. No. 11,082,445, Aug. 3, 2021, Issued.
U.S. Appl. No. 17/390,803, filed Jul. 30, 2021, Pending.
U.S. Appl. No. 14/198,499, filed Mar. 5, 2014, U.S. Pat. No. 9,398,102, Jul. 19, 2016, Issued.
U.S. Appl. No. 14/198,508, filed Mar. 5, 2014, U.S. Pat. No. 9,270,765, Feb. 23, 2016, Issued.
U.S. Appl. No. 15/213,250, filed Jul. 18, 2016, U.S. Pat. No. 9,998,496, Jun. 12, 2018, Issued.
U.S. Appl. No. 15/990,507, filed May 25, 2018, U.S. Pat. No. 10,404,755, Sep. 3, 2019, Issued.
U.S. Appl. No. 15/990,509, filed May 25, 2018, U.S. Pat. No. 10,404,756, Mar. 2019, Issued.
U.S. Appl. No. 15/990,512, filed May 25, 2018, U.S. Pat. No. 10,491,638, Nov. 26, 2019, Issued.
U.S. Appl. No. 16/554,482, filed Aug. 28, 2019, 2019-0394244, Dec. 26, 2019, Status.
U.S. Appl. No. 16/835,640, filed Aug. 25, 2015, U.S. Pat. No. 9,928,377, Mar. 27, 2018, Issued.
U.S. Appl. No. 15/936,269, filed Mar. 26, 2018, 2018-0218167, Aug. 2, 2018, Pending.
U.S. Appl. No. 15/368,240, filed Dec. 2, 2016, U.S. Pat. No. 10,826,940, Nov. 3, 2020, Issued.
U.S. Appl. No. 15/368,246, filed Dec. 2, 2016, U.S. Pat. No. 11,019,101, May 25, 2201, Issued.
U.S. Appl. No. 16/000,132, filed Jun. 5, 2018, U.S. Pat. No. 10,291,657, May 14, 2019, Issued.
U.S. Appl. No. 16/409,685, filed May 10, 2019, U.S. Pat. No. 10,979,458, Apr. 13, 2021, Issued.
U.S. Appl. No. 16/783,146, filed Feb. 5, 2020, U.S. Pat. No. 10,812,531, 20/20/2020, Issued.
U.S. Appl. No. 17/227,074, filed Apr. 9, 2021, 2021-0226998, Jul. 22, 2021, Pending.
U.S. Appl. No. 16/389,861, filed Apr. 19, 2019, U.S. Pat. No. 11,025,653, Jun. 1, 20201, Issued.
U.S. Appl. No. 15/256,483, filed Sep. 2, 2016, U.S. Pat. No. 10,270,788, Apr. 23, 2019, Issued.
Chen et al, 2020 Generative Pretraining from Pixels, Proceedings of the 37th International Conference on Machine, Learning, Vienna, Austria, PMLR 119, 2020.
Corona et al, DeltaPhish—Detecting Phishing Webpages in Compromised Websites, European Symposium on Research in Computer Security (ESORICS), Sep. 11-13, 2017, p. 370-388 [arXiv:1707.00317v1 [cs.CR] Jul. 2, 2017].
S. Afroz, "PhishZoo: Detecting Phishing Websites by Looking at Them," 2011 IEEE Fifth International Conference on Semantic Computing, 2011, pp. 368-375, doi: 10.1109/ICSC.2011.52.
Xiang et al, Cantina+—A Feature-Rich ML Framework for Detecting Phishing Web Sites, ACM Transactions on Information and System Security vol. 14 Issue 2, Sep. 2011, Article No. 21 pp. 1-28.
Xiang et al, A Hybrid Phish Detection Approach by Identity Discovery and Keywords Retrieval, WWW 2009, Apr. 20-24, 2009, Madrid, Spain. ACM 978-1-60558-487-4/09/04.
Marchal S. at al, Proactive Discovery of Phishing Related Domain Names, in "Research in Attacks, Intrusions, and Defenses", RAID 2012. Lecture Notes in Computer Science (Balzarotti et al., editors), vol. 7462. Springer, Berlin, Heidelberg.
Marchal, et al, PhishStorm—Detecting Phishing With Streaming Analytics. IEEE Transactions on Network and Service Management. IEEE Transactions on Network and Service Management, Dec. 2014,458-471. [10.1109/TNSM.2014.2377295].
Bahnsen et al, "Classifying phishing URLs using recurrent neural networks," 2017 APWG Symposium on Electronic Crime Research (eCrime), 2017, pp. 1-8, [doi 10.1109/ECRIME.2017.7945048.].

(56) References Cited

OTHER PUBLICATIONS

Marchal, S., et al On Designing and Evaluating Phishing Webpage Detection Techniques for the Real World. 11th USENIX Workshop on Cyber Security Experimentation and Test (CSET 2018) USENIX—The Advanced Computing Systems Association.
Devlin et al, BERT: Pre-training of Deep Bidirectional Transformers, Proceedings of NAACL-HLT 2019, pp. 4171, Jun. 2-Jun. 7, 2019, Association for Computational Linguistics, [arXiv:1810.04805v2 [cs.CL] May 24, 2019].
Cer et al. "Universal Sentence Encoder" ArXiv abs/1803.11175 (2018): n. pag. [arXiv:1803.11175v2 [cs.CL] Apr. 12, 2018].
Szegedy et al, Rethinking the Inception Architecture for Computer Vision, 2016 IEEE Conference on Computer Vision and Pattern Recognition (CVPR), 2016, pp. 2818-2826, doi: 10.1109/CVPR.2016.308. [arXiv:1512.00567v3 [cs.CV] Dec. 11, 2015].
Simonya et al, Very Deep Convolutional Networks for Large-Scale Image Recognition, 3rd International Conference on Learning Representations, ICLR 2015, San Diego, CA, USA, May 7-9, 2015, Conference Track Proceedings. [arXiv:1409.1556v6 [cs.CV] Apr. 10, 2015].
ExxactCorp, "A Deep Dive Into the Transformer Architecture—The Development of Transformer Models", Jul. 2020 (accessed at https://www.exxactcorp.com/blog/Deep-Learning/a-deep-dive-into-the-transformer-architecture-the-development-of-transformer-models).
Vamshi, "A Big Catch: Cloud Phishing from Google App Engine and Azure App", NetSkope, Inc., Aug. 12, 2020, 16 pgs (accessed at https://www.netskope.com/blog/a-big-catch-cloud-phishing-from-google-app-engine-and-azure-app-service).
PhishTank—Join the fight against phishing, Aug. 12, 2021, 1 pg (accessed at http://phishtank.org/index.php).
OpenPhish—Phishing Intelligence, Sep. 13, 2021, 2 pgs (accessed at https://openphish.com/).
GitHub—onnx Operators, Sep. 8, 2021, 251 pgs (accessed at https://github.com/onnx/onnx/blob/master/docs/Operators.md).
Hassan, VGG16—Convolutional Network for Classification and Detection, Nov. 20, 2018, 4 pgs (accessed at https://neurohive.io/en/popular-networks/vgg16/).
Yi Zhang et al., Netskope, Inc. KDE Hyper Parameter Determination, NetSkope, Inc. Aug. 13, 2020, 8 pgs.
"Netskope Introspection," netSkope, Inc., 2015, 3 pgs.
Netskope, "Data Loss Prevention and Monitoring in the Cloud", Nov. 2014, 18 pages.
"Repave the Cloud-Data Breach Collision Course," netSkope, Inc., 2014, 6 pgs.
NetSkope, "The 5 Steps to Cloud Confidence," netSkope, Inc., 2014, 11 pgs.
"Netskope Cloud Confidence Index," netSkope, Inc., 2015, 4 pgs.
"Netskope Active Cloud DLP", netSkope, Inc., 2015, 5 pages, downloaded from http://mtechpro.com.au/wp-content/uploads/445271-netskope-activ.pdf.
Langford, John, "vowpal_wabbit", 2 pages, [retrieved on Aug. 24, 2016], Retrieved from the Internet< https://github.com/JohnLangford/vowpal_wabbit >.
"Liblinear—A Library for Large Linear Classification", 3 pages, [retrieved on Aug. 24, 2016], Retrieved from the Internet< https://www.csie.ntu.edu.tw/~cjlin/liblinear/>.
"LIBSVM", 2 pages, [retrieved on Aug. 24, 2016], Retrieved from the Internet< https://en.wikipedia.org/wiki/LIBSVM>.
Sindhwani, Vikas, "SVMlin: Fast Linear SVM Solvers for Supervised and Semi-supervised Learning", 4 pages, [retrieved on Aug. 24, 2016], Retrieved from the Internet <http://vikas.sindhwani.org/svmlin.html>.
Wiki, "JohnLangford/vowpal_wabbit", 2 pages, [retrieved on Aug. 24, 2016], Retrieved from the Internet< https://github.com/JohnLangford/vowpal_wabbit/wiki>.
PCT/US2017/021969—International Search Report and Written Opinion dated Jun. 22, 2017, 11 pages.
Laminin Solutions: "Metadata Permissions Protects Confidential Information", Feb. 19, 2013, pp. 1-2 XP002770913.
Yague et al., "A Metadata-based access control model for web services", Computer Science Department, Internet Research, vol. 15, No. 1, University of Malaga, Malaga, Spain, Dec. 31, 2005, pp. 99-116, XP002770914.
Gowadia etal., "RDF Metadata for XML Access Control", Proceedings of the ACM Workshop on XML Security 2003. Fairfax, VA, Oct. 31, 2003, pp. 39-48, XP001198168.
Kuwabara etal., "Use of Metadata for Access Control and Version Management in RDF Database", Sep. 12, 2011, Knowledge-Based and Intelligent Information and Engineering Systems, Springer Berling Heidelberg, pp. 326-336, XP019164752.
PCT/US2017/021969—International Preliminary Report on Patentability dated Mar. 5, 2018, 13 pages.
Zhao, Y., et. al., "Bayesian Statistical Inference in Machine Learning Anomaly Detection," 2010 International Conference on Communications and Intelligence Information Security, Nanning, 2010, pp. 113-116, doi: 10.1109/ICCIIS.2010.48.
PCT/US2019/031867—International Search Reoprt and Written Opinion dated Sep. 9, 2019, 20 pages.
Kark et al, "Trends: Calculating the Cost of a Security Breach", Forrester Research, Inc. Apr. 10, 2007, 7 pgs.
"Data Breach: The Cloud Multiplier Effect", Ponemon Institute, Jun. 4, 2014, 27 pages.
Riley et al, "Magic Quadrant for Cloud Access Security Brokers", Nov. 30, 2017, 28 pages, downloaded from <<https://go.netskope.com/typ-gartner-mq-for-casb.html>>.
Lakshman et al., "Cassandra—A Decentralized Structured Storage System", 2009, 6 pages.
DeCandia et al., "Dynamo: Amazon's Highly Available Key-value Store", SOSP '07, Oct. 14-17, 2007, 16 pages.
Chang et al, "Bigtable: A Distributed Storage System for Structured Data", Operating Systems Design and Implementation, OSDI, 2006, 14 pages.
Sumit Khurana, et. al., "Performance evaluation of Virtual Machine (VM) scheduling policies in Cloud computing (spaceshared & timeshared)"; 2013 Fourth International Conference on Computing, Communications and Networking Technologies (ICCCNT); Year: Jul. 2013; pp. 1-5.
PCT/US2019/031867—International Prelinary Report on Patentability dated Nov. 24, 2020, 12 pages.
PCT/US2014/21174—International Search Report and Written Opinion, dated Aug. 29, 2014, 13 pages.
PCT/US2014/21174—International Preliminary Report on Patentability, dated Sep. 8, 2015, 10 pages.
Cheng et al., "Cloud Security For Dummies, Netskope Special Edition," John Wiley & Sons, Inc. 2015.
"The Netskope Advantage: Three "Must-Have" Requirements for Cloud Access Security Brokers", Jul. 2015, WP-12-2, 4 pages.
Sergiu Gatlan, "Phishing Campaign Uses Google Drive to Bypass Email Gateways", Aug. 14, 2019, 3 pages (downloaded Aug. 27, 2020 from https://www.bleepingcomputer.com/news/security/phishing-campaign-uses-google-drive-to-bypass-email-gateways/).
P.A. Legg, 0. Buckley, M. Goldsmith and S. Creese, "Automated Insider Threat Detection System Using User and Role-Based Profile Assessment," in IEEE Systems Journal, vol. 11, No. 2, pp. 503-512, Jun. 2017, doi: 10.1109/JSYST.2015.2438442. (Year: 2017).
PCT/US2021/015082—International Search Report and Written Opinion dated May 11, 2021, 14 pgs.

* cited by examiner

FIG. 3 Bidirectional Encoder Representations from Transformers (BERT) (Prior Art)

FIG. 5 Residual Neural Network (ResNet) for Image Classification (Prior Art)

MACHINE LEARNING-BASED SYSTEMS AND METHODS OF USING URLS AND HTML ENCODINGS FOR DETECTING PHISHING WEBSITES

RELATED CASES

This application is related to the following contemporaneously filed applications which are incorporated by reference for all purposes as if fully set forth herein:

U.S. application Ser. No. 17/475,236, titled "A Machine Learning-Based system for Detecting Phishing Websites Using the URLs, Word encodings and Images of Content Pages" filed 14 Sep. 2021; and U.S. application Ser. No. 17/475,233, "Detecting Phishing Websites via a Machine Learning-Based System Using URL Feature Hashes, HTML Encodings and Embedded Images of Content Pages" filed 14 Sep. 2021; and This application is also related to the following applications which are incorporated by reference for all purposes as if fully set forth herein:

U.S. application Ser. No. 17/390,803, titled "Preventing Cloud-Based Phishing Attacks Using Shared Documents with Malicious Links", filed 30 Jul. 2021 which is a continuation of U.S. application Ser. No. 17/154,978, titled "Preventing Phishing Attacks Via Document Sharing", filed 21 Jan. 2021, now U.S. Pat. No. 11,082,445, issued 3 Aug. 2021.

INCORPORATIONS

The following materials are incorporated by reference in this filing:

"KDE Hyper Parameter Determination," Yi Zhang et al., Netskope, Inc.

U.S. Non-Provisional application Ser. No. 15/256,483, entitled "Machine Learning Based Anomaly Detection", filed Sep. 2, 2016 (now U.S. Pat. No. 10,270,788, issued Apr. 23, 2019);

U.S. Non-Provisional application Ser. No. 16/389,861, entitled "Machine Learning Based Anomaly Detection", filed Apr. 19, 2019 (now U.S. Pat. No. 11,025,653, issued Jun. 1, 2021);

U.S. Non-Provisional application Ser. No. 14/198,508, entitled "Security For Network Delivered Services", filed Mar. 5, 2014 (now U.S. Pat. No. 9,270,765, issued Feb. 23, 2016);

U.S. Non-Provisional application Ser. No. 15/368,240 entitled "Systems and Methods of Enforcing Multi-Part Policies on Data-Deficient Transactions of Cloud Computing Services", filed Dec. 2, 2016 (now U.S. Pat. No. 10,826,940, issued Nov. 3, 2020) and U.S. Provisional Application 62/307,305 entitled "Systems and Methods of Enforcing Multi-Part Policies on Data-Deficient Transactions of Cloud Computing Services", filed Mar. 11, 2016;

"Cloud Security for Dummies, Netskope Special Edition" by Cheng, Ithal, Narayanaswamy, and Malmskog, John Wiley & Sons, Inc. 2015;

"Netskope Introspection" by Netskope, Inc.;

"Data Loss Prevention and Monitoring in the Cloud" by Netskope, Inc.;

"The 5 Steps to Cloud Confidence" by Netskope, Inc.;

"Netskope Active Cloud DLP" by Netskope, Inc.;

"Repave the Cloud-Data Breach Collision Course" by Netskope, Inc.; and

"Netskope Cloud Confidence Index™" by Netskope, Inc.

FIELD OF THE TECHNOLOGY DISCLOSED

The technology disclosed generally relates to cloud-based security, and more specifically to systems and methods for detecting phishing websites, using the URLs, word encodings and images of the content pages. Also disclosed are methods and systems for using URL feature hashes, HTML encodings and embedded images of content pages. The disclosed technology further relates to detecting phishing in real time via URL links and downloaded HTML, through machine learning and statistical analysis.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Phishing, sometimes called spearhead phishing, is on the rise. National news has been punctuated by misuse of documents obtained using passwords stolen by phishing. Typically, an email includes a link that looks legitimate, leading to a page that looks legitimate, and a user types in a password that the phishing attack compromises. A cleaver phishing site, like a credit card skimmer or shim at a gas pump or ATM, may forward the password entered to the real website and step out of the way, so the user does not detect the password theft when it happens. Working from home in recent times has led to a large increase in phishing attacks.

The term phishing refers to a number of methods to fraudulently acquire sensitive information over the web from unsuspecting users. Phishing arises, in part, from the use of increasingly sophisticated lures to fish for a company's confidential information. These methods are generally referred to as phishing attacks. Website users fall victim to phishing attacks when rendered web pages are mimicking the look of a legitimate login page. Victims of phishing attacks are lured into fraudulent websites, which results in sensitive information exposure such as bank accounts, login passwords, social security identities, etc.

According to the recent data breach investigation reports, the popularity of large attacks grounded in social engineering has increased. This could be in part due to increasing difficulty of exploits, and partially thanks to utilization of the advancement of machine learning (ML) algorithms to prevent and detect such exploits. As such, phishing attacks have become more frequent and sophisticated. Novel defensive solutions are needed.

An opportunity arises for using ML/DL for classifying a URL and a content page accessed via the URL as phishing or not phishing. An opportunity also emerges for classifying a URL and a content page accessed via the URL link and downloaded HTML as phishing or not phishing, in real time.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 12B shows one section of the dataflow graph in two columns, separated by a dotted line, with a connector at the bottom of the left column feeding into the top of the right column, illustrating the input encoding and positional embedding.

FIG. 12C illustrates a single iteration of multi-head attention, showing an example of a dataflow graph with compute nodes that asynchronously transmit data along data connections.

FIG. 12D shows the add and normalize and feedforward functionality using ONNX operations, illustrated using three columns, separated by dotted lines.

DETAILED DESCRIPTION

Figure 1:
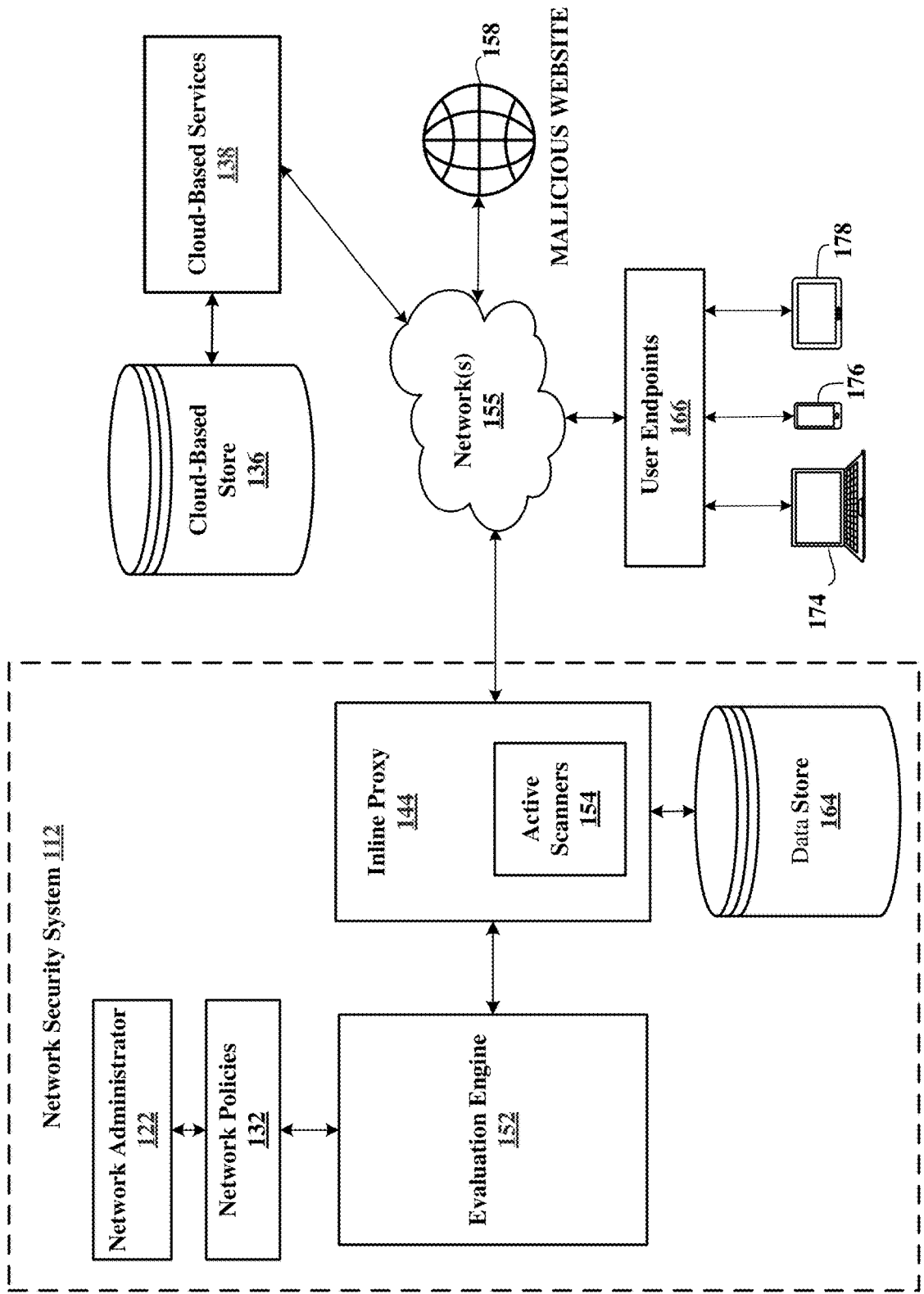
FIG. 1 illustrates an architectural level schematic of a system classifies a URL and a content page accessed via the URL as phishing or not phishing, in accordance with an implementation of the technology disclosed.

The following detailed description is made with reference to the figures. Sample implementations are described to illustrate the technology disclosed, not to limit its scope, which is defined by the claims. The discussion is presented to enable any person skilled in the art to make and use the technology disclosed, and is provided in the context of a particular application and its requirements. Various modifications to the disclosed implementations will be readily apparent to those of ordinary skill in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The problem addressed by the disclosed technology is detection of phishing websites. Security forces attempt to catalogue phishing campaigns as they arise. Security vendors depend on lists of phishing websites to power their security engines. Both proprietary and open sources are available that catalogue phishing links. Two open source, community examples of phishing Universal Resource Locator (URL) lists are PhishTank and OpenPhish. Lists are used by security forces that analyze malicious links and generate signatures from malicious URLs. The signatures are used to detect malicious links, typically by matching part or all of a URL or a compact hash thereof. Generalization from signatures have been the main approach to stopping zero-day phishing attacks that hackers can use to attack systems. Zero-day refers to recently discovered security vulnerabilities that the vendor or developer has only just learned of and has zero days to fix.

Sometimes phishing campaigns end before the website at the phishing link can be analyzed, as phishers evade getting caught. Websites can be dismantled by phishers as quickly as they are posted to lists by security forces. Analysis of collected URLs is more reliably persistent than following malicious URLs to active phishing sites. The sites disappear as suddenly as they appear. In part due to disappearing sites, the state of the art has been to analyze URLs.

The technology disclosed applies machine learning/deep learning (ML/DL) to phishing detection with a very low false positive rate and good recall. Three transfer learning techniques are presented, based on text/image analysis and based on HTML analysis.

In the first technique, we use transfer learning by taking advantage of recent deep learning architectures for multi-lingual natural language understanding and computer vision, in order to embed the textual and visual contents of web pages. The first generation of applying ML/DL to phishing detection uses concatenated embeddings of web page text and web page images. We train a detection classifier, which uses the encoder function of models, such as the Bidirectional Encoder Representations from Transformers (BERT) and the decoder function of the residual neural network (ResNet), taking advantage of transfer learning from general training on embedding of text and images. Being trained on large amounts of data, the final layers of such models serve as reliable encodings for the visual and textual contents of web pages. Care is taken to reduce false positives, as benign, non-phishing links are far more abundant than phishing sites and blocking of non-phishing links is annoying.

The second technique of applying ML/DL to phishing detection creates a new encoder-decoder pair that counter-intuitively decodes an embedding of HTML to replicate rendering by a browser to a display. The embedding is, of course lossy. The decoding is much less precise than a browser accomplishes. An encoder-decoder approach to embedding HTML code facilitates transfer learning. Once the encoder has been trained to embed the HTML, a classifier replaces the decoder. Transfer learning based on embedding is practical with a relatively small training corpus. At present, as few as 20 k or 40 k examples of phishing page examples has proven sufficient to train a classifier of two fully connected layers, which processes embeddings. The second generation embedding of HTML can be enhanced by concatenating other embeddings, such as the ResNet image embedding, a URL feature embedding or both the ResNet image embedding and URL feature embedding.

The scale of new URLs however can hinder the real-time detection of web pages using their contents, due to the high computational complexity of deep learning architectures as well as the rendering time and parsing time of the contents of web pages.

A third generation of applying ML/DL to phishing detection classifies a URL and a content page accessed via the URL as phishing or not phishing using a URL embedder, an HTML encoder, and a phishing classifier layer, and can react in real time when a malicious web page is detected. This third technology effectively filters the suspicious URLs, using a trained, faster model without the need to visit any website. Suspicious URLs can also be routed to the first or second technology later for final detection.

Example systems for detecting phishing via URL links and downloaded HTML in offline mode and in real time are described next.

Architecture

FIG. 1 shows an architectural level schematic of a system 100 for detecting phishing via URL links and downloaded HTML. System 100 also includes functionality for detecting phishing via redirected or obscured URL links and downloaded HTML in real time. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

FIG. 1 includes system 100 including the endpoints 166. User endpoints 166 may include devices such as computers 174, smart phones 176, and computer tablets 178, which provide access and interact with data stored on a cloud-based store 136 and cloud-based services 138. In another organization network, organization users may utilize additional devices. An inline proxy 144 is interposed between the user endpoints 166 and the cloud-based services 138 through the network 155 and particularly through a network security system 112 including a network administrator 122, network policies 132, an evaluation engine 152 and a data store 164, which will be described in more detail. The in-line proxy 144 is accessible through network 155, as part of the network security system 112. The in-line proxy 144 provides traffic monitoring and control between the user endpoints 166, the cloud-based store 136 and other cloud-based services 138. The in-line proxy 144 has active scanners 154, which collect HTML and snapshots of web pages and store the data sets in data store 164. When features can be extracted in real time from the traffic and snapshots are not collected from the live traffic, active scanners 154 are not needed for crawling the web page content at the URLs, as in the third-generation system of applying ML/DL to phishing detection. The three ML/DL systems for detecting phishing websites are described in detail below. The in-line proxy 144 monitors the network traffic between user endpoints 166 and cloud-based services 138, particularly to enforce network security policies including data loss prevention (DLP) policies and protocols. Evaluation engine 152 checks the database record of URLs deemed to be malicious, via the disclosed detecting of phishing websites, and these phishing URLs are automatically and permanently blocked.

For detecting phishing via URL links and downloaded HTML in real time, in-line proxy 144, positioned between the user endpoints 166 and the cloud-based storage platform, inspects and forwards incoming traffic to phishing detection engine 202, 404, 602, which are described below. The inline proxy 144 can be configured to sandbox the content corresponding to links and inspect/explore the links to make sure the pages pointed to by the URLs are safe, before allowing users to access the pages through the proxy. Links identified as malicious can then be quarantined, and inspected for threats utilizing known techniques, including secure sandboxing.

Continuing with the description of FIG. 1, cloud-based services 138 includes cloud-based hosting services, web email services, video, messaging, and voice call services, streaming services, file transfer services, and cloud-based storage service. Network security system 112 connects to user endpoints 166 and cloud-based services 138 via public network 155. Data store 164 stores lists of malicious links and signatures from malicious URLs. The signatures are used to detect malicious links, typically by matching part or all of a URL or a compact hash thereof data store 164 stores information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud-based services 138. Non-structured data, such as free text, can also be provided by, and targeted back to cloud-based services 138. Both structured and non-structured data are capable of being stored in a semi-structured data format like a JSON (JavaScript Object Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store 178 like Apache Cassandra™ Google's Bigtable™, HIBase™, Voldemort™, CouchDB™, MongoDB™, Redis™, Riak™ Neo4j™, etc., which stores the parsed JSON objects using key spaces that are equivalent to a database in SQL. Each key space is divided into column families that are similar to tables and comprise of rows and sets of columns.

Continuing further with the description of FIG. 1, system 100 can include any number of cloud-based services 138: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™ Amazon AWS™, Microsoft Office 365™, Workday™, Oracle on Demand™, Taleo™ Yammer™, Jive™, and Concur™.

In the interconnection of the elements of system 100, network 155 couples computers, tablets and mobile devices, cloud-based hosting service, web email services, video, messaging and voice call services, streaming services, file transfer services, cloud-based storage service 136 and network security system 112 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, network security system 112 includes data store 164 which can include one or more computers and computer systems coupled in communication with one another. They can also be one or more virtual computing and/or storage resources. For example, network security system 112 can be one or more Amazon EC2 instances and data store 164 can be Amazon S3™ storage. Other computing-as-service platforms such as Rackspace, Heroku or Force.com from Salesforce could be used rather than implementing network security system 112 on direct physical computers or traditional virtual machines. Additionally, one or more engines can be used and one or more points of presence (POPs) can be established to implement the security functions. The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Despite the best attempts of malicious actors, the contents and the appearance of phishing websites provide features that the disclosed deep learning models can utilize to reliably detect phishing websites. In the disclosed systems described next, we use transfer learning by taking advantage of recent deep learning architectures for multilingual natural language understanding and computer vision, in order to embed the textual and visual contents of web pages.

Figure 2:
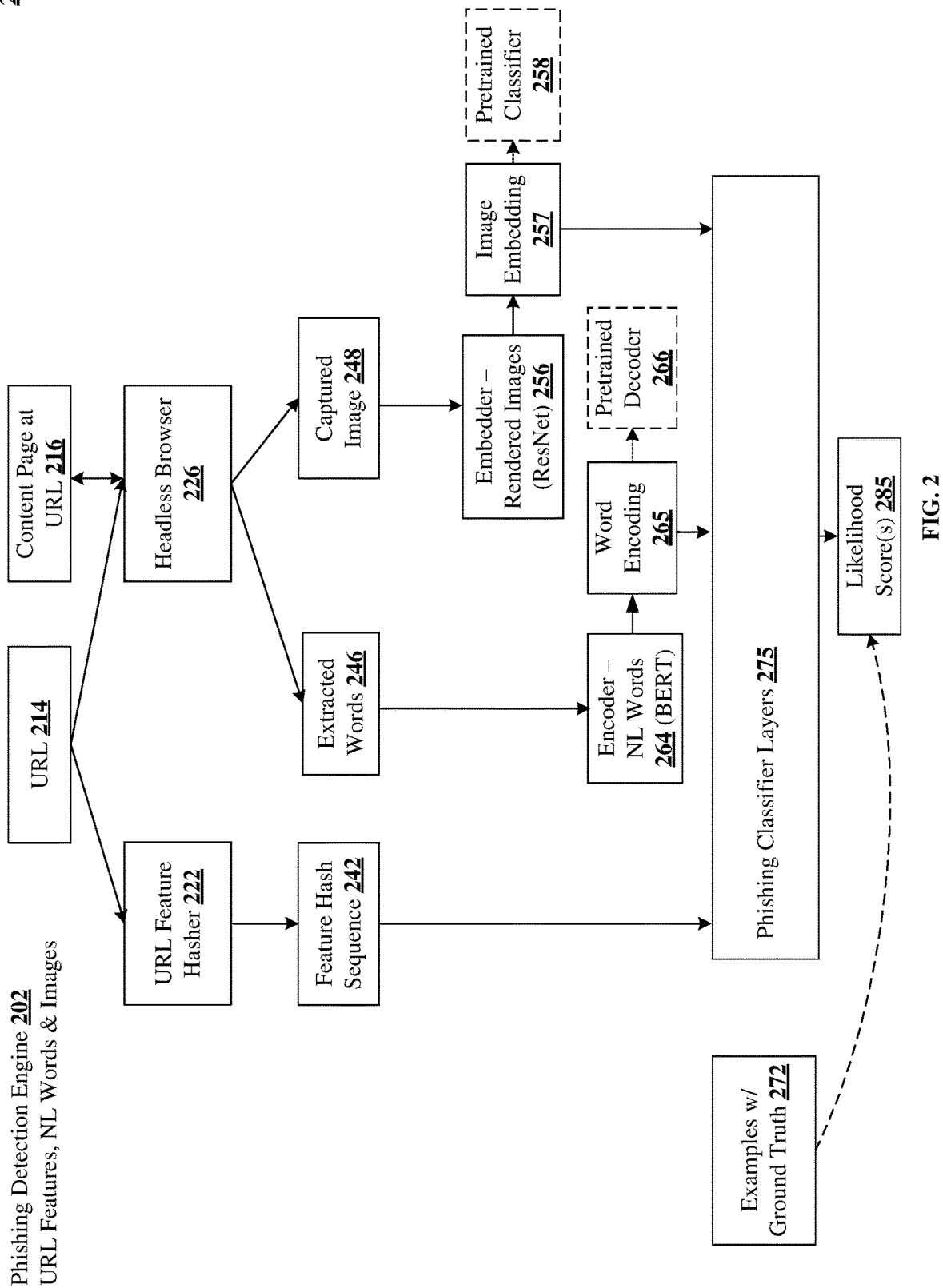
FIG. 2 illustrates a high level block diagram of disclosed phishing detection engine that utilizes ML/DL encoding of a URL feature hash, encoding of natural language (NL) words and encoding of a captured website image for detecting phishing sites.

FIG. 2 illustrates a high-level block diagram 200 of disclosed phishing detection engine 202 that utilizes ML/DL with a URL feature hash, encoding of natural language (NL) words and embedding of a captured website image for detecting phishing sites. Disclosed phishing classifier layers 275 generate likelihood score(s) 285 that signal how likely it is that a specific website is a phishing website. Phishing detection engine 202 utilizes a Multilingual Bidirectional Encoder Representations from Transformers (BERT) model which supports over 100+ languages as encoder 264, and utilizes a residual neural network (ResNet50), for images as embedder 256, in one embodiment. URL feature hash 242, word encoding 265 and image embedding 257 then are passed to neural network phishing classifier layers 275 for final training and inference, as described below.

Encoders can be trained by pairing an encoder and a decoder. The encoder and decoder can be trained to squeeze the input into the embedding space, then reconstruct the input from the embedding. Once the encoder is trained, it can be repurposed, as described herein. Phishing classifier layers 275 utilize URL feature hash 242 of the URL n-gram, word encoding 265 of words extracted from the content page, and image embedding 257 of an image captured from content page 216 at URL 214 web address.

In one embodiment, phishing detection engine 202 utilizes feature hashing of content of webpages as well as security information present in the response headers, to complement the features available in both benign and phishing webpages. The content is expressed in JavaScript in one implementation. A different language, such as Python can be used in another embodiment. URL feature hasher 222 receives URL 214 and parses the URL into features and hashes the features to produce URL feature hash 242, resulting in dimensionality reduction of the URL n-gram. An example of domain features for a URL with headers plus security information is listed next.

"scanned_url": [
"http://alfabeek.com/"
],
"header": {
"date": "Tue, 2 Mar. 2021 15:30:27 GMT",
"server": "Apache",
"last-modified": "Tue, 8 Sep. 2020 02:09:49 GMT",
"accept-ranges": "bytes",
"vary": "Accept-Encoding",
"content-encoding": "gzip"

"content-length": "23859",
"content-type": "text/html" },
"security_info": [
{
  "subjectName": "alfabeek.com",
  "_issuer": "Sectigo RSA Domain Validation Secure Server CA",
  "_validFrom": 1583107200,
  "_validTo": 1614729599,
  "_protocol": "TLS 1.3",
  "_sanList": [
    "alfabeek.com",
    "www.alfabeek.com"
  ]

Continuing the description of FIG. 2, headless browser 226 is configured to access content at the URL and internally render a content page, to extract words from the rendering of the content page and capture an image of at least part of the rendering of the content page. Headless browser 226 receives URL 214 which is the web address of content page 216 and extracts words from content page 216. Headless browser 226 provides extracted words 246 to natural language encoder 264, which generates an encoding from the extracted words: word encoding 265 in block diagram 200. Natural language (NL) encoder 264 is pretrained on natural language, producing an encoding of words extracted from the content page. Encoder 264 utilizes standard encoder, BERT for natural language, in one example embodiment. Encoders embed input that they process in a relatively low dimensionality embedding space. BERT embeds natural language passages in a 400 to 800 dimension embedding space. Transformer logic accepts natural language input and produces, in one instance, a 768-dimension vector that encodes and embeds the input. The dashed block outline of pretrained decoder 266 distinguishes is as pretrained. That is, BERT is trained prior to use for detecting phishing of URL 214. Encoder 264 produces word encoding 265 of words extracted from a content page being screened, for use by phishing classifier layers 275 to detect phishing. A different ML/DL encoder such as Universal Sentence Encoder can be utilized in a different implementation. A long short-term memory (LSTM) model could be utilized in a different embodiment.

Further continuing the description of FIG. 2, headless browser 226 receives URL 214 which is the web address of content page 216 and captures an image of the web page, by mimicking a real user visiting the webpage, and taking a snapshot of the rendered web page. Headless browser 226 snapshots and provides captured image 248 to image embedder 256, which is pretrained on images, and produces an embedding of the image captured from the content page. Image embedding can increase efficiency and improve phishing detection for obfuscated cases. Embedder 256 encodes captured image 248 as image embedding 257. Embedder 256 utilizes a standard embedder, residual neural network (ResNet50), with pretrained classifier 258 for images, in one embodiment. A different ML/DL pre-trained image embedder such as Inception-v3, VGG-16, ResNet34 or ResNet-101 can be utilized in a different implementation. Continuing with the example embodiment, ResNet50 embeds an image, such as an RGB 224×224 pixel image, and produces a 248-dimension embedding vector that maps the image into the embedding space. The embedding space is much more compact than the original input. Pretrained ResNet50 embedder 256 produces image embedding 257 of a snapshot of the content page being screened, to be used for detecting phishing websites.

Phishing classifier layers 275, of disclosed phishing detection engine 202, are trained on the URL feature hashes, the encoding of the words extracted from the content page and the embedding of the image captures from the content page of example URLs, with each example URL accompanied by a ground truth classification as phishing or as not phishing. Phishing classifier layers 275 process the URL feature hash, word encoding and image embedding to produce at least one likelihood score that the URL and the content accessed via the URL represents a phishing risk. The likelihood score 285 signals how likely it is that the specific website is a phishing website. In one embodiment, the input size to phishing classifier layers 275 is 2048+768+1024, where the output of BERT is 768, the ResNet50 embedding size is 2048, and the size of feature hash over n-grams of URLs is 1024. Phishing detection engine 202 is highly suitable for semantically meaningful detection of phishing websites regardless of their language. The disclosed near real-time crawling pipeline captures the contents of new and suspicious webpages quickly, before they get invalidated, thus addressing the short life-cycle nature of phishing attacks, and this helps to accumulate a larger training dataset for continuous retraining of the prescribed deep learning architecture.

Figure 3:
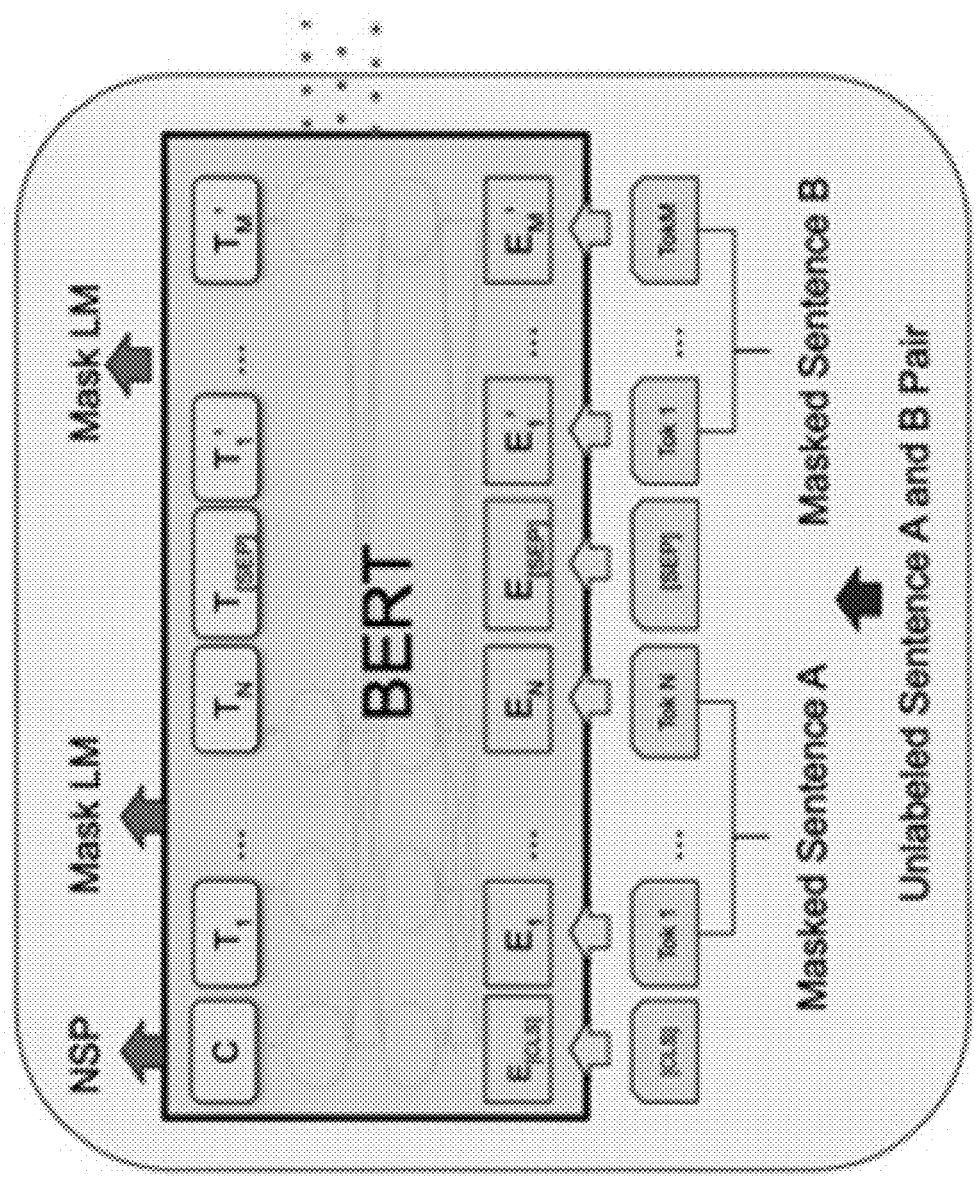
FIG. 3 illustrates an example ResNet residual CNN block diagram for image classification, for reference.

FIG. 3 illustrates a reference Bidirectional Encoder Representations from Transformers (BERT) block diagram that can be utilized for natural language classification of the words extracted from a web content page, such as is described relative to the block diagram shown in FIG. 2 above.

A second system for applying ML/DL to phishing detection takes advantage of image transfer learning and also uses Generative Pretraining (GPT) for learning HTML embeddings. This addresses the issue of having a limited phishing dataset and also provides better representation for the contents for HTML. Unlike the first approach, there is no need for a BERT text encoding. The HTML embedding network learns to represent the entire multimodal contents of HTML contents (text, JS, CSS, etc.) by a vector of 256 numbers. The theoretical foundation of this HTML embedding network is inspired by "Open AI Generative Pretraining From Pixels" published in Proceedings of the 37th International Conference on Machine Learning, PMLR 119:1691-1703, 2020.

Figure 4:
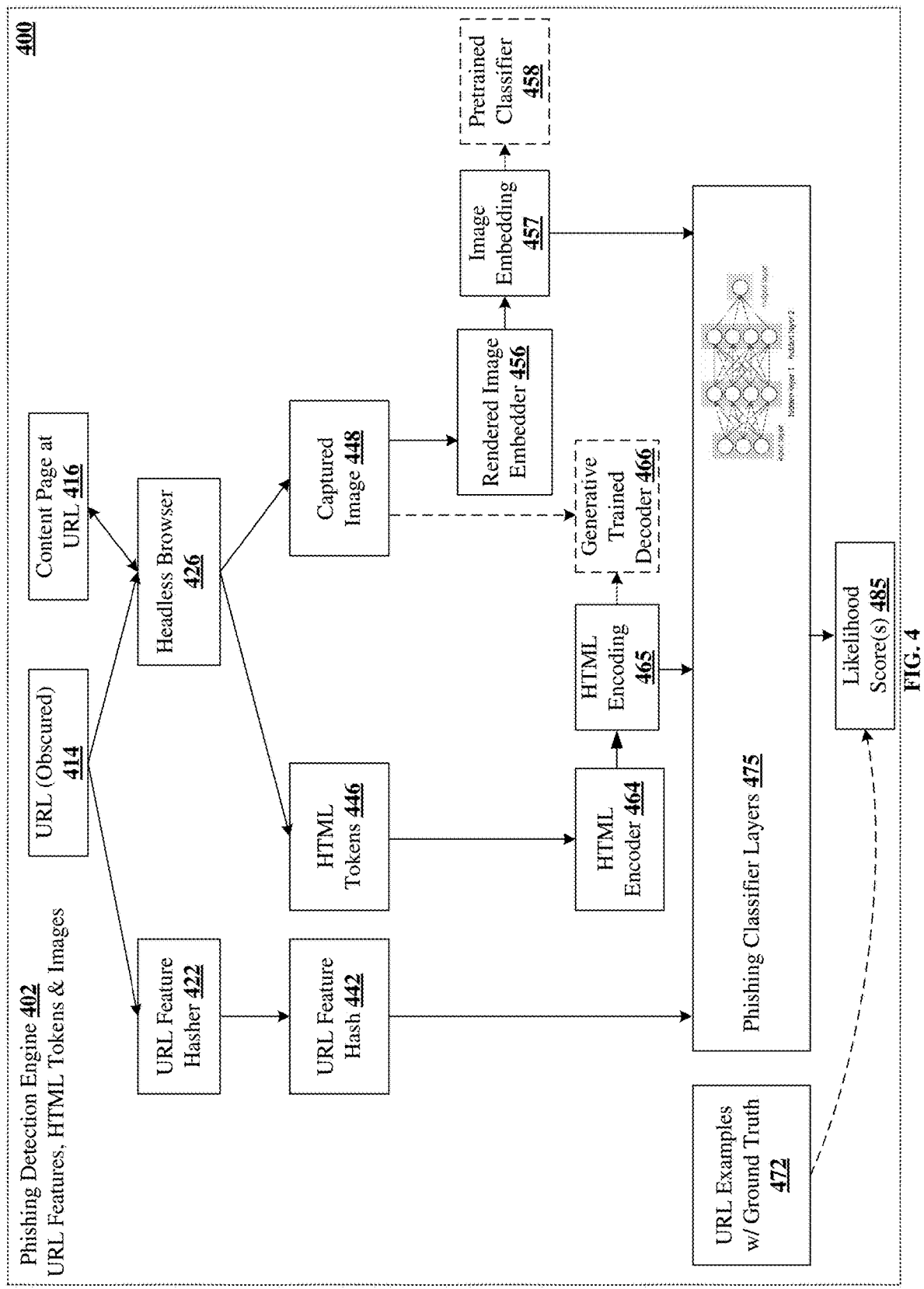
FIG. 4 illustrates a high-level block diagram of a disclosed phishing detection engine that utilizes ML/DL with the URL feature hash, the encoding of the HTML extracted from the content page, and the embedding of the image captured from the content page of example URLs, each example URL accompanied by a ground truth classification as phishing or as not phishing, for detecting phishing sites.

FIG. 4 illustrates a high-level block diagram 400 of a disclosed phishing detection engine 402 that utilizes ML/DL with the URL feature hash, the encoding of the HTML extracted from the content page, and the embedding of the image captured from the content page of example URLs, each example URL accompanied by a ground truth classification as phishing or as not phishing, for detecting phishing sites. Disclosed phishing classifier layers 475 produce as least one likelihood score 485 that the URL and the content accessed via the URL presents a phishing risk.

Phishing detection engine 402 uses URL feature hasher 422 that parses URL 414 into features and hashes the features to produce URL feature hash 442, resulting in dimensionality reduction of the URL n-gram. An example of domain features for a URL with headers plus security information is listed above.

Headless browser 426 extracts and provides HTML tokens 446 to HTML encoder 464. Phishing detection engine 202 utilizes disclosed HTML encoder 464, trained on HTML tokens 446 extracted from content pages at example URLs 416, encoded, then decoded to reproduce images captured from rendering of the content pages. Dashed lines distinguish training from later processing of active URLs, including the dashed line from captured image 448 to dashed block outline of generative trained decoder 466 that produces the rendered image of the page from the encoder embeddings. Learning the data distribution P(X) is very beneficial for subsequent supervised modeling of P(X|Y) where Y is the binary class of phishing and non-phishing and X is the HTML contents. HTML encoder 464 gets pretrained using generative pre-training (GPT) in which unsupervised pre-training over a large volume of unsupervised data is utilized for learning the data distribution P(X) for subsequent supervised decision making with P(Y|X). Once HTML encoder 464 is trained, it can be repurposed. HTML encoder 464 produces an HTML encoding 465 of the HTML tokens 446 extracted from the content page 416.

HTML gets tokenized based on rules, and the HTML tokens 446 get passed to HTML encoder 464. Collaborative clearing houses for data and information about phishing on the Internet that provide open source, community examples of phishing URL lists include PhishTank, OpenPhish, MalwarePatrol and Kaspersky, which serve as sources for HTML files that have been identified as phishing websites. Negative samples, which do not include phishing, balance the data set in a proportion that represents current trends for phishing websites. The HTML encoder 464 gets trained using a large unlabeled data set of HTML and page snapshots, which are gathered by in-house active scanners 154. Because users of websites fall victim to attacks especially when malicious rendered pages are mimicking the look of a legitimate login page, the training objective forces the HTML encoder to learn to represent the HTML contents with respect to their rendered image.

For training, HTML encoder 464 is initialized with random initial parameters and parameters for the HTML. 700K HTML files in data store 164 were scanned and the resulting extraction of the top 10K tokens that represent a content page was used for configuring phishing detection engine 402 for classification that does not suffer from significant number of false positive results, in one embodiment. In one example content page, 800 valid tokens were extracted. In another example, 2K valid tokens were recognized, and in a third example, approximately 1K tokens were collected.

An HTML parser can be used to extract HTML tokens from a content page accessed via the URL, in another embodiment. Both headless browsers and HTML parsers can be configured to extract the HTML tokens that belong to a predetermined token vocabulary and ignore portions of the content that do not belong to the predetermined token vocabulary. Phishing detection engine 402 includes the headless browser configured to extract for production of HTML encodings of up to 64 of the HTML tokens, in one embodiment. 64 is a specific, configurable system parameter. The extraction can use up to 10 ms to render, in some cases. In another embodiment, the headless browser can be configured to extract for production of HTML encodings of up to 128, 256, 1024 or 4096 of the HTML tokens. The use of more tokens slows the training. Implementation of up to 2 k tokens has been accomplished. Training can be utilized to learn what sequential pattern of HTML tokens gives rise to a particular page view. A mathematical approximation is usable to learn what distribution of tokens to later use for better classification.

Continuing the description of FIG. 4, an image embedder, pretrained on images, produces an image embedding of the image captured from the content pages. Pre-trained embedder coefficients enable cost-effective embedding in near real time. Headless browser 426 is configured to access content at the URL and internally render a content page. Headless browser 226 receives URL 414 which is the web address of content page 416 and captures an image of the web page, by mimicking a real user visiting the webpage, and taking a snapshot of the rendered web page. Headless browser 426 snapshots and provides captured image 448 to rendered image embedder 456, which is pretrained on images, and produces an embedding of the image captured from the content page. Image embedding can increase efficiency and improve phishing detection, which is especially useful for obfuscated cases. Embedder 456 encodes captured image 448 as image embedding 457. Rendered image embedder 456 utilizes a standard embedder, residual neural network (ResNet50), with pretrained classifier 458 for images, in one embodiment. A different ML/DL pre-trained image embedder such as Inception-v3, VGG-16, ResNet34 or ResNet-101 can be utilized in a different implementation. Continuing with the example embodiment, ResNet50 embeds an image, such as an RGB 224×224 pixel image, and produces a 2048-dimension embedding vector that maps the image into the embedding space. The embedding space is much more compact than the original input. Pretrained ResNet50 embedder 456 produces image embedding 457 of the image captured from the content page, to be used for detecting phishing websites. URL feature hash 442, HTML encoding 465 and image embedding 457 are passed to neural network phishing classifier layers 475 for final training and inference, as described next. The input size for the final classifier is 2048 (ResNet50 embedding size)+256 (encoding size of the HTML encoder)+1024 (size of feature hash over n-grams of URLs), in one embodiment. New phishing websites get submitted by a security team in an hourly fashion, in one production system. In one example phishing website, an HTML script starts, then blank sections are detected, and then the HTML script ends. The disclosed technology supports timely detection of new phishing websites.

Phishing classifier layers 475, of disclosed phishing detection engine 402, are trained on the URL feature hashes, the HTML encoding of the HTML tokens extracted from the content page and the embedding of the captured image from the content page of example URLs, with each example URL accompanied by ground truth 472 classification as phishing or as not phishing. After training, phishing classifier layers 275 process URL feature hash 442, HTML encoding 465 and image embedding 457 to produce at least one likelihood score 485 that the URL and the content accessed via the URL 414 presents a phishing risk. The likelihood score 485 signals how likely it is that the URL and the content accessed via the URL presents a phishing risk. Example pseudo-code for training the model is listed next, for classification loss, clf_loss, binary phishing or not, and the difference between what classifier expects to see and what it sees, Gen_loss.

```
def training_step(self, batch, batch_idx):
html_tokens, snapshot, label, resnet_embed,
    domain_features=batch
#Tuning and classification
if self.classify:
    embedding, logits=self.gpt(x, classify=True)
    gen_loss=self.criterion(logits, y)
    clf_logits=self.concat_layer(torch.cat([embedding, res-
        net_embed, domain_features], dim=1))
    clf_loss=self.clf_criterion(clf_logits, label)
    #joint loss for classification
    loss=clf_loss+gen_loss
#Generative pre-training
else:
    generated_img=self.gpt(html_tokens)
    loss=self.criterion(generated_img, snapshot)
```

Figure 5:
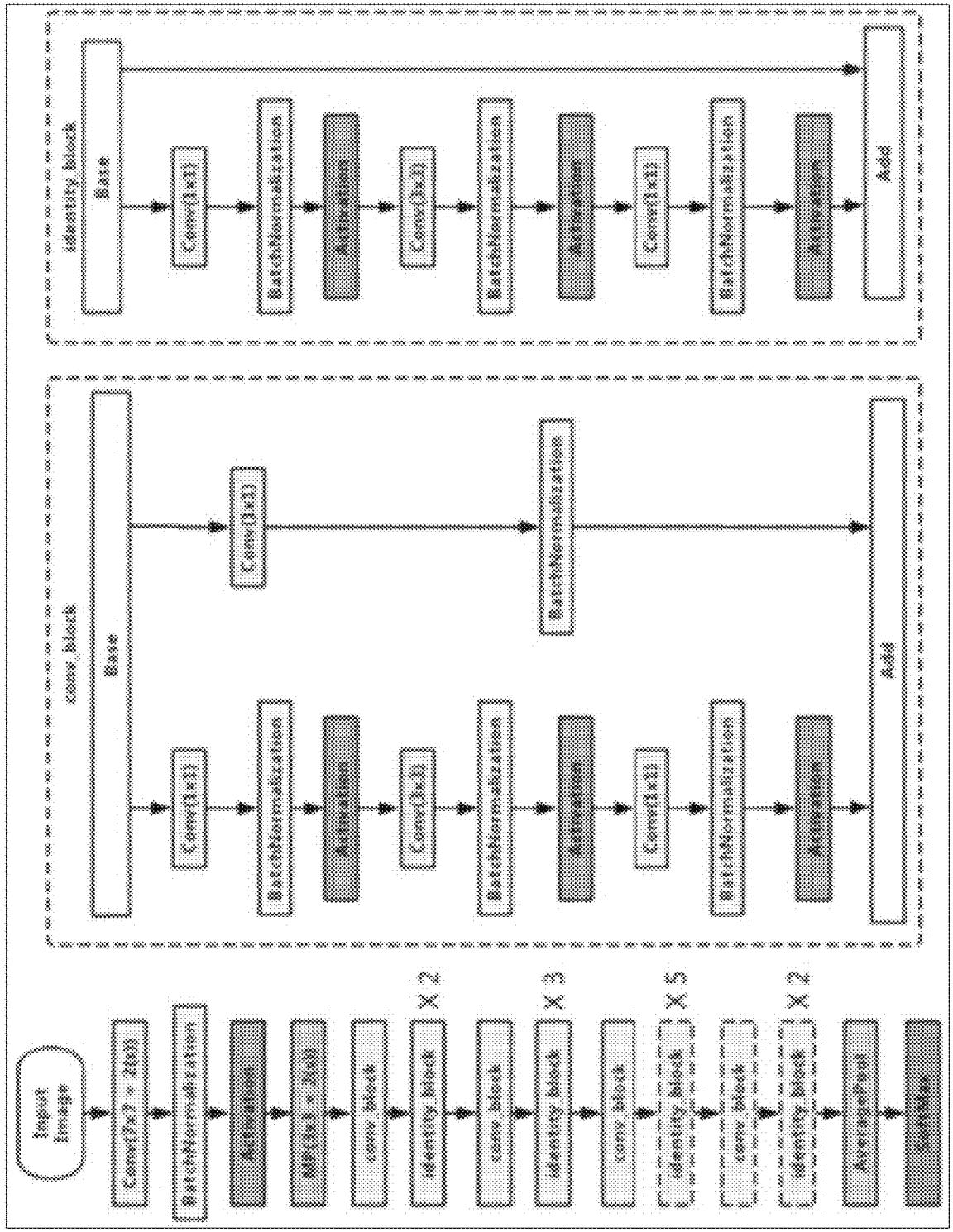
FIG. 5 illustrates a reference residual neural network (ResNet) block diagram, which is pretrained for classification of images, prior to use in phishing detection engine.

FIG. 5 illustrates a reference residual neural network (ResNet) block diagram, which is pretrained for classification of images, prior to use in phishing detection engine 402.

With inline phishing, the web page is rendered on the user side at user endpoints 166, so a snapshot of the page is not available, so no ResNet is utilized, and the phishing detection classifier does not have access to header information for the content page. Next we describe a disclosed classifier system that utilizes a URL and HTML tokens extracted from a page to classify a URL and a content page accessed via the URL as phishing or not. This third system is particularly useful in a production environment when access to the snapshot of the visited content and to the header information is unavailable, and can operate in real time in a network security system.

Figure 6:
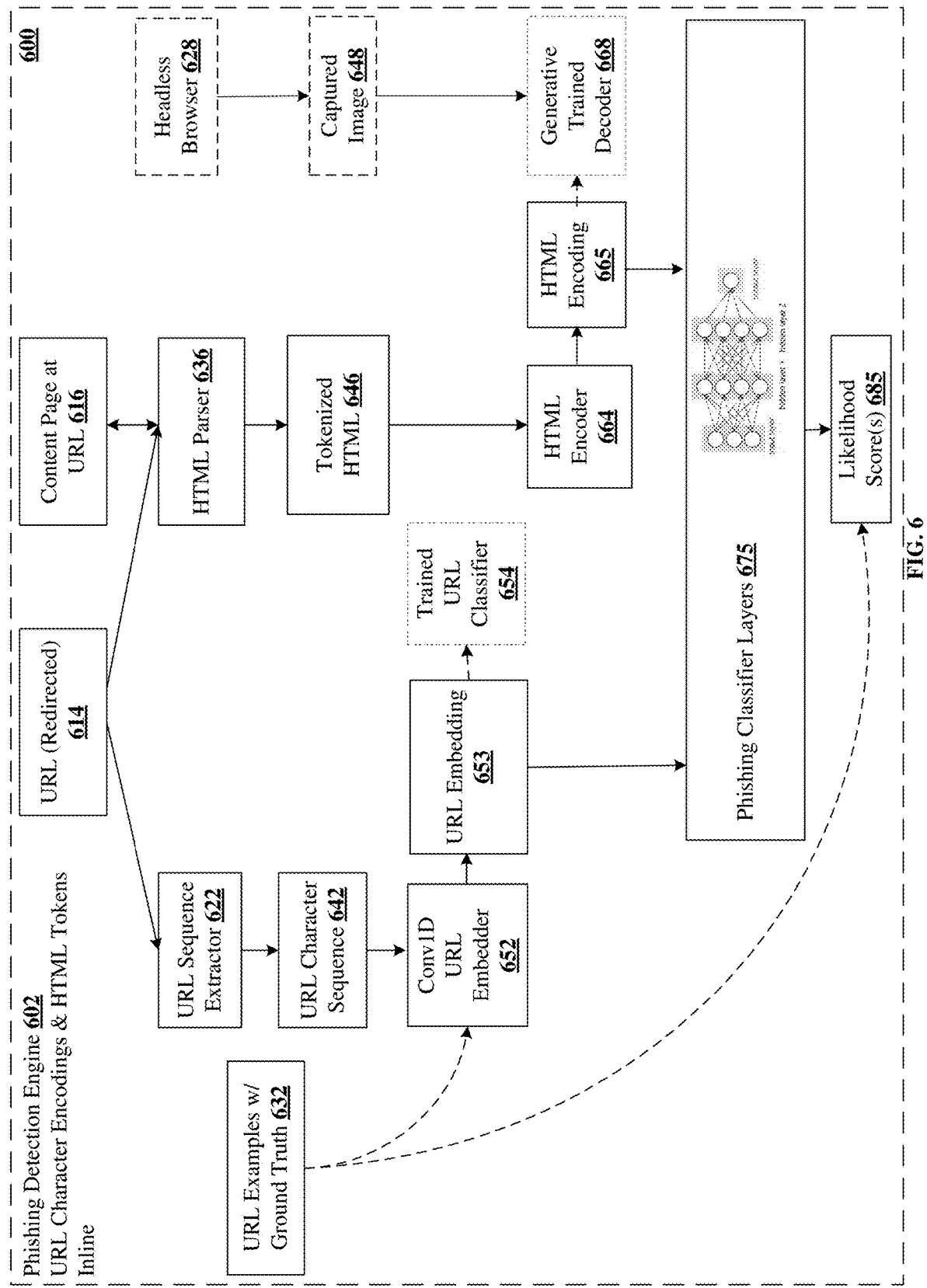
FIG. 6 illustrates a high-level block diagram of a disclosed phishing detection engine 602 that utilizes ML/DL with a URL embedder and an HTML encoder.

Another disclosed classifier system applies ML/DL for classifying a URL and content accessed via the URL as phishing or not, when access to the snapshot of the visited content and to the header information is unavailable. FIG. 6 illustrates a high-level block diagram 600 of a disclosed phishing detection engine 602 that utilizes ML/DL with a URL embedder and an HTML encoder. The encoding of the HTML gets extracted from the content page of pointed to by a URL. Disclosed phishing classifier layers 675 produce as least one likelihood score 685 that the URL and the content accessed via the URL presents a phishing risk.

Phishing detection engine 602 uses URL link sequence extractor 622 that extracts characters in a predetermined character set from the URL 614 to produce a URL character sequence 642. One dimensional 1D convolutional neural network (Conv1D) URL embedder 652 produces a URL embedding 653. Prior to use for classifications, URL embedder 652 and URL classifier 654 are trained using example URLs accompanied by ground truth 632 that classifies the URL as phishing or as not phishing. The dashed block outline of trained URL classifier 654 distinguishes the training from later processing of active URLs. During training of URL embedder 652 the differences beyond the phishing classifier layers to embedding layers used to produce the URL embedding are back-propagated.

Continuing the description of the system 600 illustrated in FIG. 6, phishing detection engine 602 also utilizes disclosed HTML encoder 664, which is trained using HTML tokens 646 parsed by HTML parser 636 from content pages at example URLs 616, encoded, then decoded to reproduce images captured from rendering of the content pages. Parsing extracts meaning from available metadata. In one implementation, tokenization operates as a first step of parsing to identify HTML tokens within a stream of metadata, and parsing then goes on to use the context that the token is found in to determine the meaning and/or the kind of information being referenced. HTML encoder 664 produces an HTML encoding 665 of the HTML tokens 646 extracted from the content page 616.

During training, headless browser 628 captures an image of a content page for a URL, for use in pre-training. The dashed line from captured image 648 to dashed block outline of generative trained decoder 668 that produces the rendered image of the page from the encoder embeddings, distinguishes the training from later processing of active URLs. For training, HTML encoder 664 is initialized with random initial parameters and parameters for the HTML. HTML encoder 664 gets pre-trained using generative pre-training in which unsupervised pre-training over a large volume of unsupervised data is utilized for learning the data distribution $P(X)$ for subsequent supervised decision making with $P(Y|X)$. Once HTML encoder 664 is trained, it gets repurposed for use in production. During training of encoder 664 the differences to encoding layers used to produce the HTML encodings are back-propagated beyond the phishing classifier layers. Training data includes 206,224 benign and 69,808 phishing pages in one embodiment.

Further continuing the description of the system 600, phishing classifier layers 675 are trained on URL embedding and the HTML encoding of example URLs, each example URL accompanied by the ground truth classification as phishing or as not phishing 632. During training of URL embedder 652, the differences to encoding layers used to produce the URL embedding 653 are back-propagated beyond the phishing classifier layers. That is, once HTML encoder 664 is pre-trained, the URL embedding 653 network is trained alongside the rest of network (classifier layers 675 and fine-tuning step of the HTML encoder 654) with loss function and the help of URL examples with ground truth 632 for the input information After training, phishing classifier layers 675 process a concatenated input of the URL embedding 653 and the HTML encoding 665 to produce at least one likelihood score that the URL and the content accessed via the URL presents a phishing risk. Phishing detection engine 602 applies phishing classifier layers 675 to a concatenated input of the URL embedding and the HTML encoding, to produce at least one likelihood score 685 that the URL and the content accessed via the URL presents a phishing risk.

HTML parser 636 extracts HTML tokens from a content page accessed via the URL. HTML parser 636 is configurable to extract from the content the HTML tokens that belong to a predetermined token vocabulary and ignore portions of the content that do not belong to the predetermined token vocabulary, such as carriage returns and line feeds, in one example. In training for determining the number of HTML tokens to specify for training HTML encoder 664, a scan of 700K HTML files in data store 164 and the resulting extraction of the top 10K tokens that represent a content page was used for configuring phishing detection engine 602 for classification that does not suffer from significant number of false positive results, in one embodiment. In one example content page, 800 valid tokens were extracted, in another example, 2K valid tokens were recognized, and in a third example, approximately 1K tokens were collected. Training is used to learn what sequential pattern of HTML tokens gives rise to a specific content page.

For a real time phishing detection system that utilizes an inline implementation, care is taken to minimize the size of the vocabulary, for speed considerations. For phishing detection engine 602, HTML parser 636 is configured to extract for production of HTML encodings of up to 64 of the HTML tokens, in one embodiment. A different number of HTML encodings can be utilized in a different implementation. In another embodiment, the headless browser can be configured to extract for production of HTML encodings of up to 128, 256, 1024 or 4096 of the HTML tokens.

Phishing patterns evolve constantly, and it is often challenging for a detection method to achieve a high true positive rate (TPR) while maintaining a low false positive rate (FPR). A precision-recall curve shows the relationship between precision (=positive predictive value) and recall (=sensitivity) for the possible cut-offs.

Figure 7:
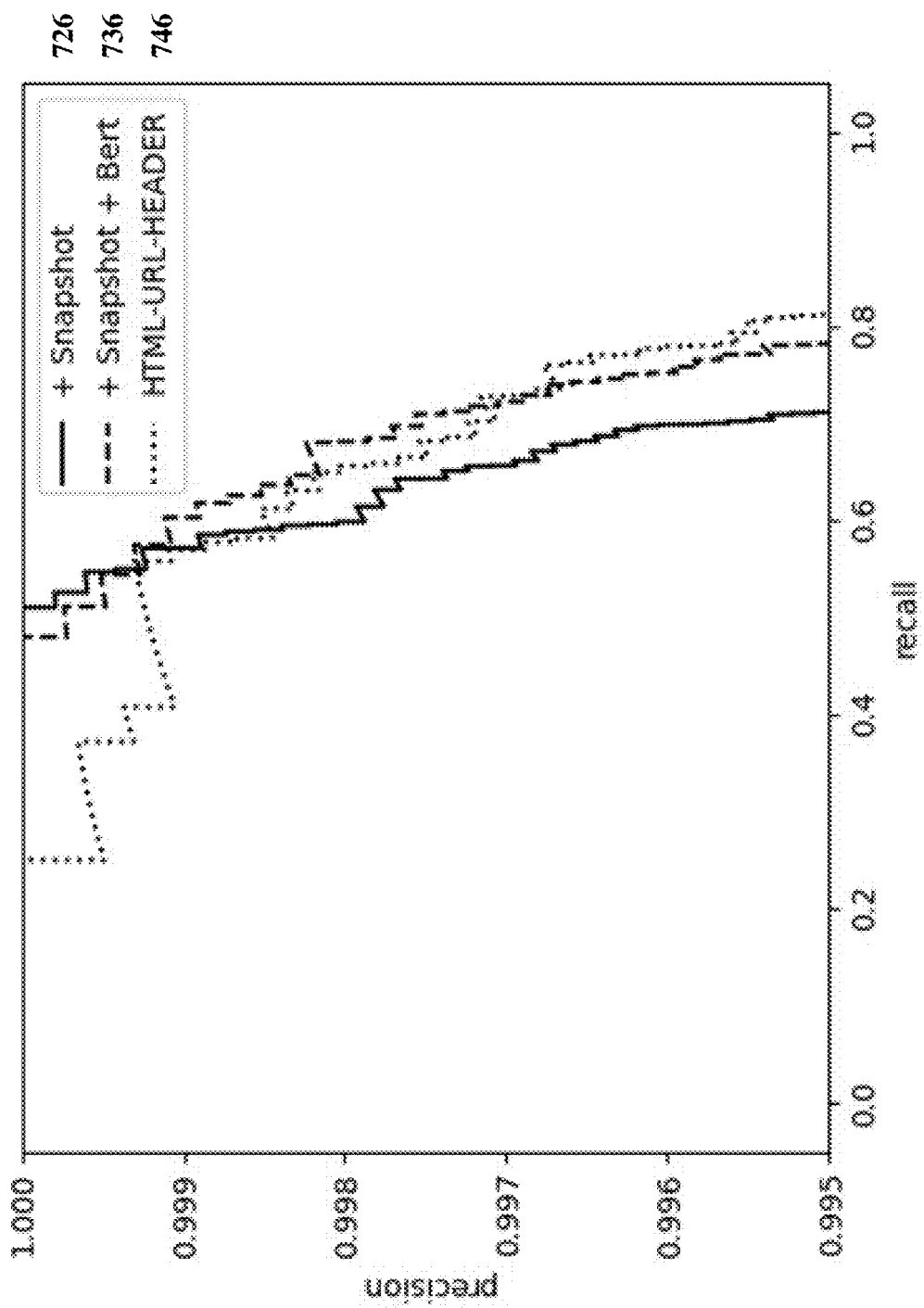
FIG. 7 shows a precision recall graph for multiple disclosed phishing detection systems.

FIG. 7 shows a precision recall graph for multiple disclosed phishing detection systems. Due to the requirement for almost no false positive detections, precision of results near the top of the graph is of interest, where precision is near 1.000. The curve with HTML plus URL plus header content is represented by the dotted line 746. Snapshot (ResNet) plus BERT, represented as a curve with long dashes 736, is more precise than HTML plus URL plus header content, and Snapshot represented as a solid curve 726 is the most precise phishing technique. BERT is computationally expensive, and the graph shows that BERT is not needed for obtaining precise phishing detection results.

Figure 8:
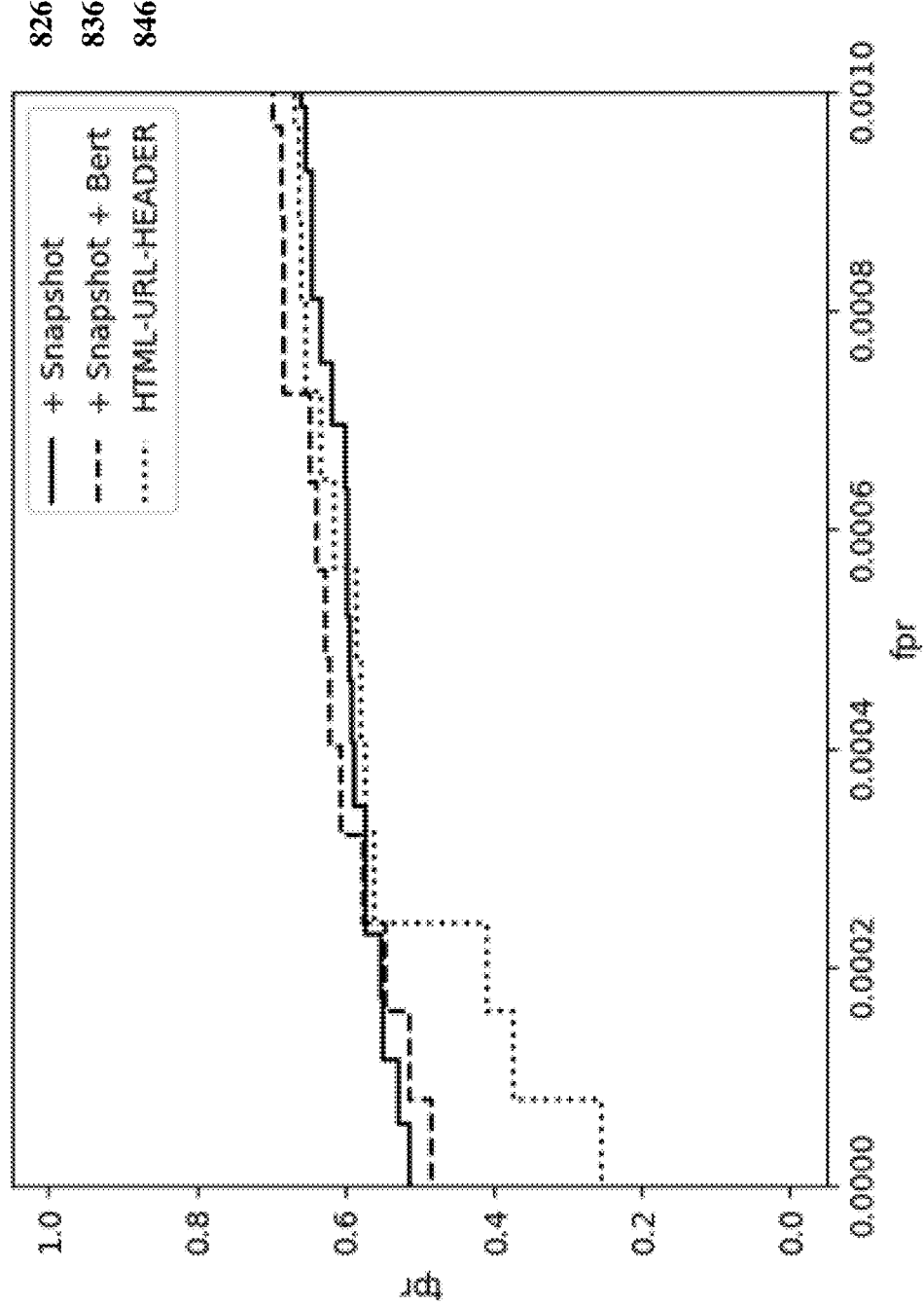
FIG. 8 illustrates the receiver operating characteristic curves (ROC) for disclosed systems for phishing website detection described herein.

FIG. 8 illustrates the receiver operating characteristic curves (ROC) for systems for phishing website detection described above. The ROC curves are plots of the true positive rate (TPR) as a function of the false positive rate (FPR) at various threshold settings. The area of interest is the area under the curve with very low FPR, because false positive identification of content pages as phishing websites is untenable. The ROC curves are useful for comparing the systems for detecting phishing websites described above. For phishing detection engine 202 the ROC curve labeled+ Snapshot+Bert 836 and illustrated with long dashes shows results for the system that utilizes ML/DL with a URL feature hash, encoding of NL words and embedding of the captured website image. A second system, phishing detection engine 402 utilizes ML/DL with URL feature hashes, encoding of the HTML tokens extracted from the content page, and the embedding of the image captured from the content page for detecting phishing sites. The curve labeled+ Snapshot 826 shows higher precision for the system, with fewer false positives than for HTML—URL—Header 846, whose curve is illustrated with dots.

Continuing the description of the ROC curves of FIG. 8, with different combinations of features including the Multilingual Bert embeddings, a comparison illustrates that text embedding, such as BERT, hurts the efficacy of the model, perhaps due to the HTML encoder already taking the textual contents into account, so that including more text encodings can lead to overfitting over the text of the HTML pages. +Snapshot 826 has higher precision and leads to the least number of FPs in production. Moreover, the version of the model without image embeddings results in a system that can bypass the active scanner/headless browser function in environments such as runtime environments in which snapshots are unavailable. In one example, running headless browsers may be too costly and not scalable to a huge number of URLs faced in production environments. Moreover, sometimes the attackers can avoid detection in such environments.

Figure 9:
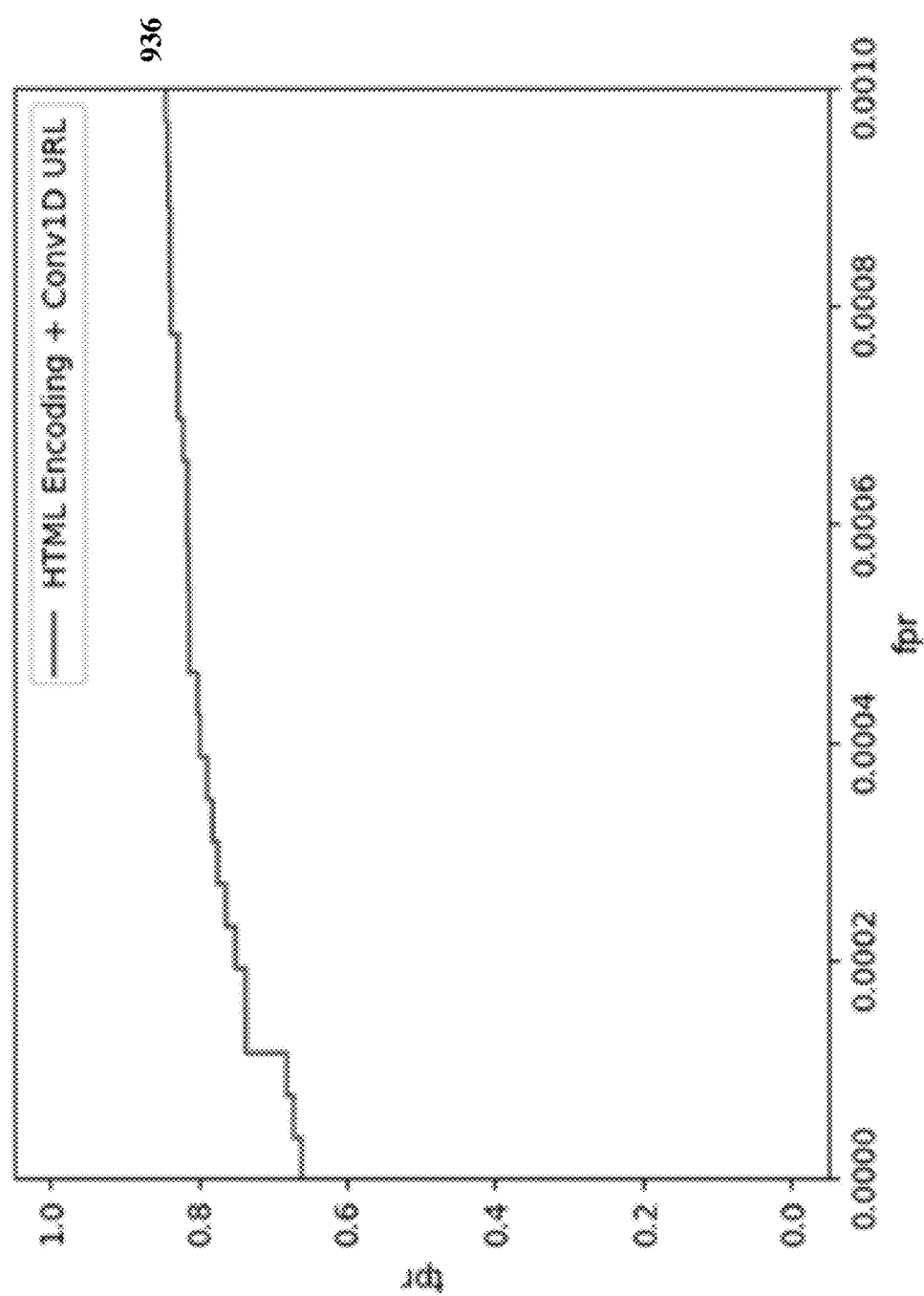
FIG. 9 illustrates the receiver operating characteristic curve (ROC) for phishing website detection for the disclosed phishing detection engine that utilizes ML/DL with a URL embedder and an HTML encoder.

FIG. 9 illustrates the receiver operating characteristic curve (ROC) for phishing website detection for phishing detection engine 602 that utilizes ML/DL with a URL embedder and an HTML encoder. The ROC curve 936 is a plot of the true positive rate (TPR) as a function of the false positive rate (FPR) at various threshold settings. ROC curve 936 illustrates that phishing detection engine 602 has a higher true positive rate than the phishing detection systems whose ROC curves are depicted in FIG. 8.

URL embedder 652 and html encoder 664 of phishing detection engine 602 comprise high-level programs that have irregular memory access patterns or data dependent flow control. A high-level program is source code written in programming languages like C, C++, Java, Python, and Spatial. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL. In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, single instruction, multiple data (SIMD) vectorization, and pipelining.

Figure 10:
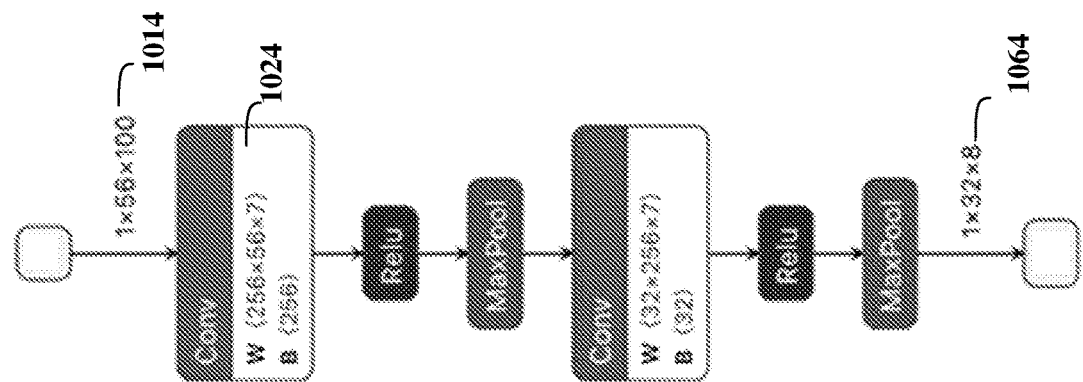
FIG. 10 illustrates a block diagram of the functionality for one dimensional 1D convolutional neural network (Conv1D) URL embedder that produces a URL embedding, with the C++ code expressed in open neural network exchange (ONNX) format.

FIG. 10 illustrates a computation dataflow graph of the functionality for one dimensional 1D convolutional neural network (Conv1D) URL embedder 652 that produces URL embedding 653, with the C++ code expressed in open neural network exchange (ONNX) format. The URL inputs the first one hundred characters of the URL 1014 and uses a one hot encoding, in one example embodiment, resulting in a convolution block with weight 256×56×7 1024 (kernel size=7, like a sliding window) and generates a binary output for the multidimensional feature. The output with dimension 1×32×8 (1×256) 1064 represents the final URL embedding 653 generated as an input to phishing classifier layers 675.

Figure 11:
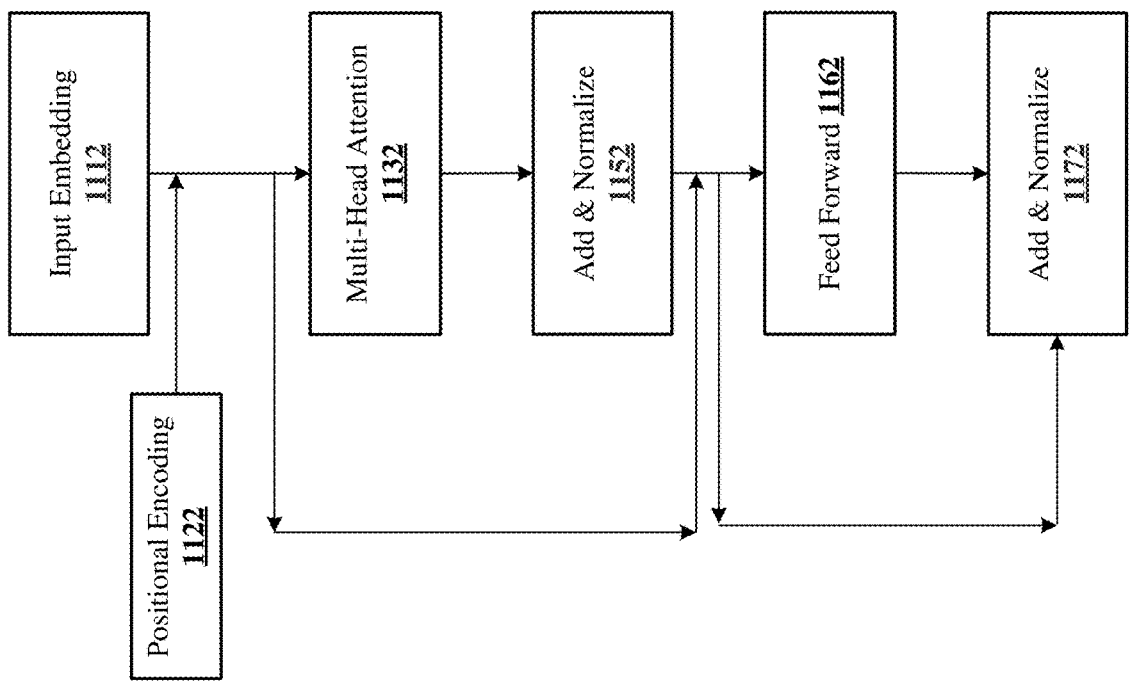
FIG. 11 shows a block diagram of the functionality for disclosed html encoder, which results in html encoding which is input to phishing classifier layers.

FIG. 11 shows a diagram of the blocks of disclosed html encoder 664, which produces html encoding 665 as an input to phishing classifier layers 675. The HTML encoder architecture gets pre-trained with the help of a Convolutional decoder that reconstructs the image seen in the training data. The decoder is typically a Convolutional Neural Network (CNN. Training forces the HTML encoder to learn to represent the HTML contents with respect to their rendered image, therefore skipping irrelevant parts of the HTML. The training is aligned with the way phishing attacks are launched, where users fall victim to phishing attacks as long as the rendered pages are mimicking the look of a legitimate page. Next we describe an overview of the functionality of the blocks. Input embedding 1112 takes in the 64 HTML tokens extracted by HTML parser 636, as described earlier, and maps the HTML tokens to the vocabulary. Positional encoding 1122 adds contextual information for the vector of HTML tokens. Multi-head attention 1132 generates multiple self-attention vectors for identifying which elements of the input to focus on. Abstract vectors Q, K and V extract different components of the input and are used to calculate the attention vectors. The multi-attention vectors represent the relationship between the HTML vectors. Multi-head attention 1132 gets repeated four times in the illustrated computation dataflow graph described relative to FIG. 12A-D below, representing the quadratic multi-head attention. The number of heads can be doubled or made even larger, in a different embodiment. Multi-head attention 1132 passes the attention vectors to feed forward network 1162, one vector at a time. Feed forward network 1162 transforms the vectors for the next block. Each block ends with an add and normalize operation, depicted by add and normalize 1172, for smoothing and normalizing the layers across each feature, squeezing the HTML representation to 256 numbers that regenerate the image seen in training data. The output represents the final HTML encoding 665 generated as an input of 256 numbers to phishing classifier layers 675.

Figure 12A:
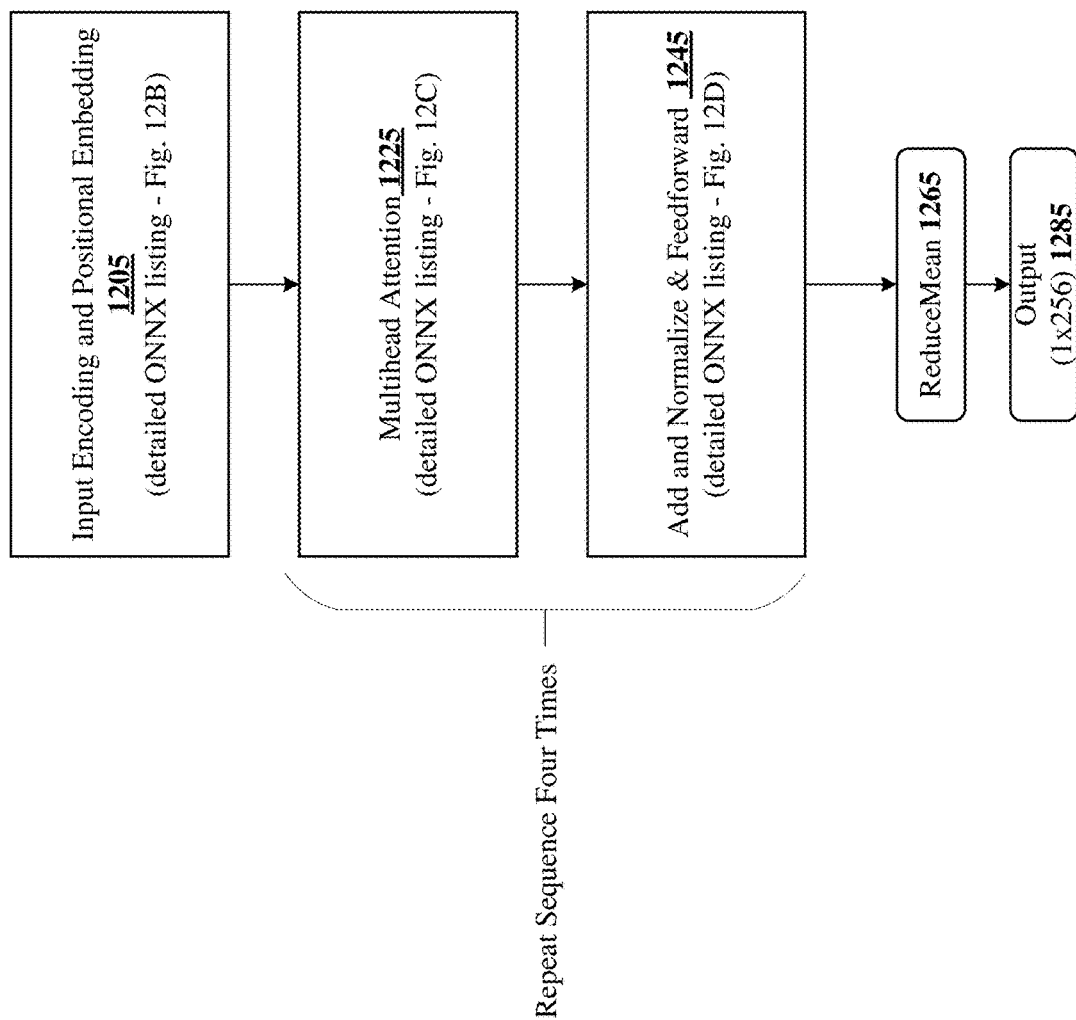
FIG. 12A shows an overview block diagram for disclosed html encoder which results in html encoding which is input to phishing classifier layers.
Figure 12B:
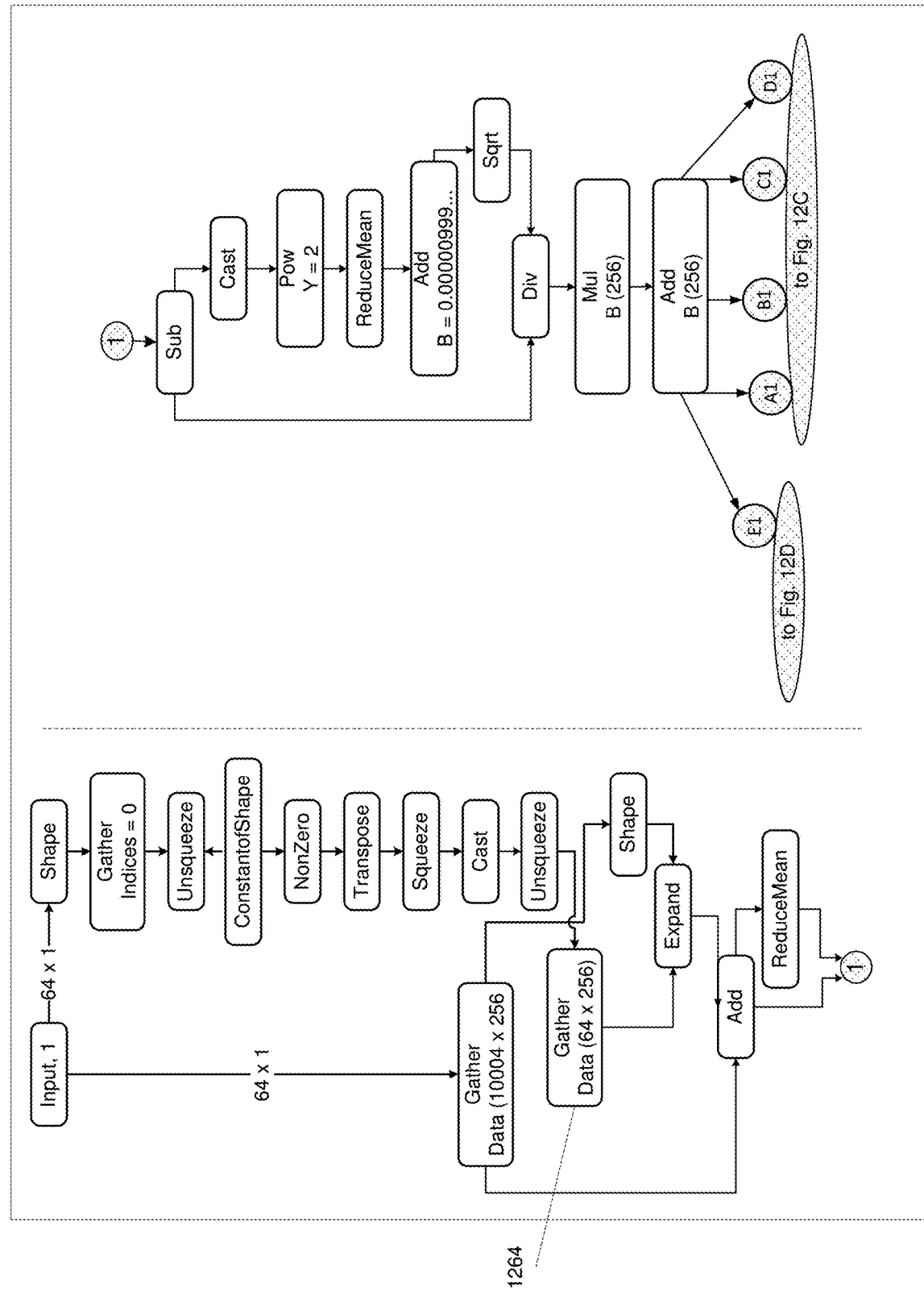
FIG. 12B, FIG. 12C and FIG. 12D together illustrate a computation dataflow graph of the functionality for html encoder which results in html encoding which is input to phishing classifier layers 675, with the C++ code expressed in open neural network exchange (ONNX) format.
Figure 12C:
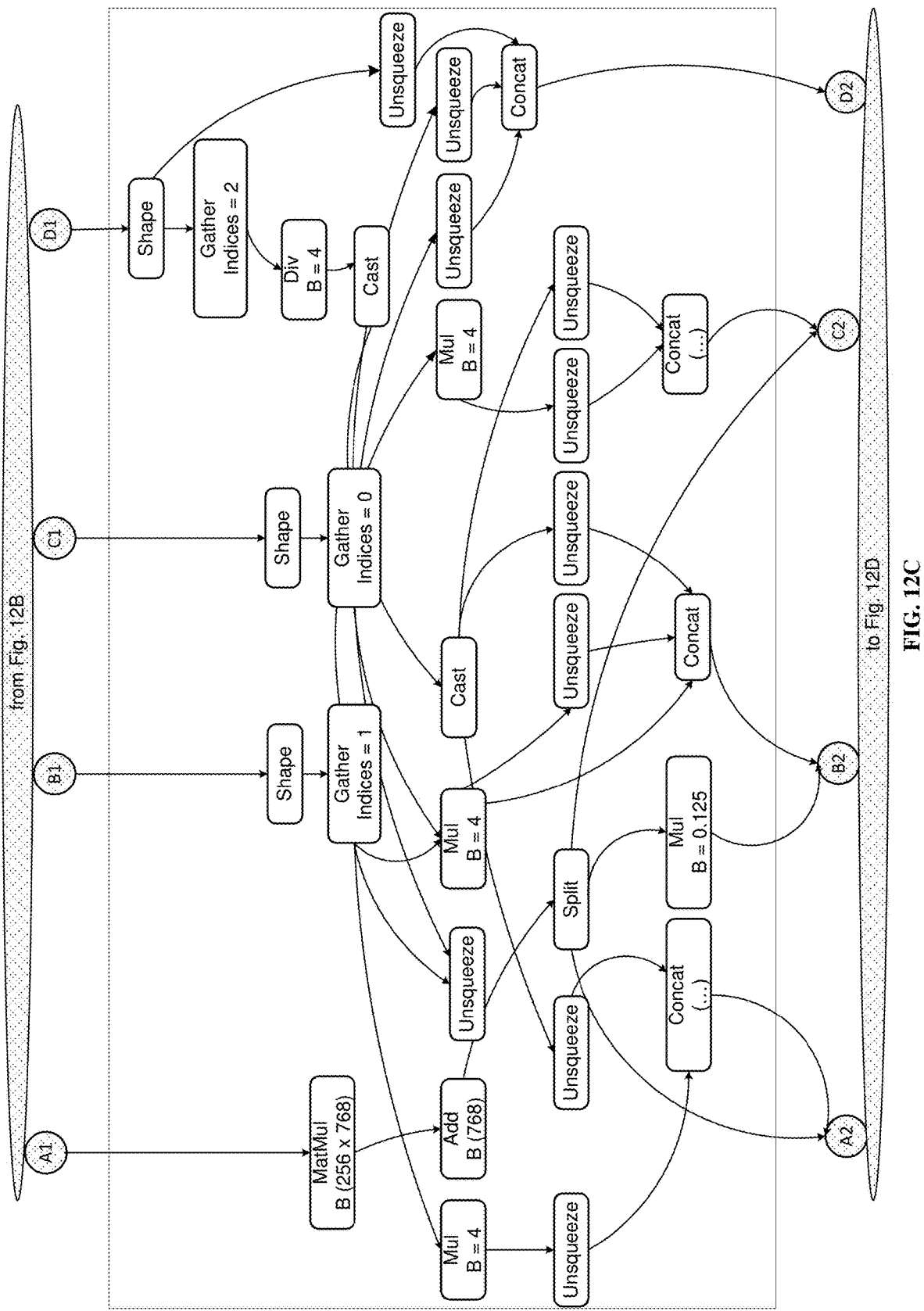

FIG. 12A shows an overview block diagram for disclosed html encoder 664 which results in html encoding 665 which is input to phishing classifier layers 675. Input encoding and positional embedding 1205 are described relative to FIG. 11 above, and a detailed ONNX listing is illustrated in FIG. 12B. Multi-head attention 1225 is described relative to FIG. 11 above and FIG. 12C shows a detailed ONNX image with inputs from the input encoding and positional embedding shown as inputs to the operator schemas for implementing the block from FIG. 12B. Add and normalize and feedforward 1245 are described relative to FIG. 11 also, with a detailed ONNX listing in FIG. 12D. FIG. 12A also includes Reduce Mean 1265 operator that reduces over the dimensions of the input tensor, computing the mean of the input tensor's element along the provided axes. HTML encoding 665 output is a 1×256 vector 1285 generated and mapped as an input to phishing classifier layers 675. Details of inputs, outputs and operations performed for ONNX operators are well known by those of skill in the art.

Figure 12D:
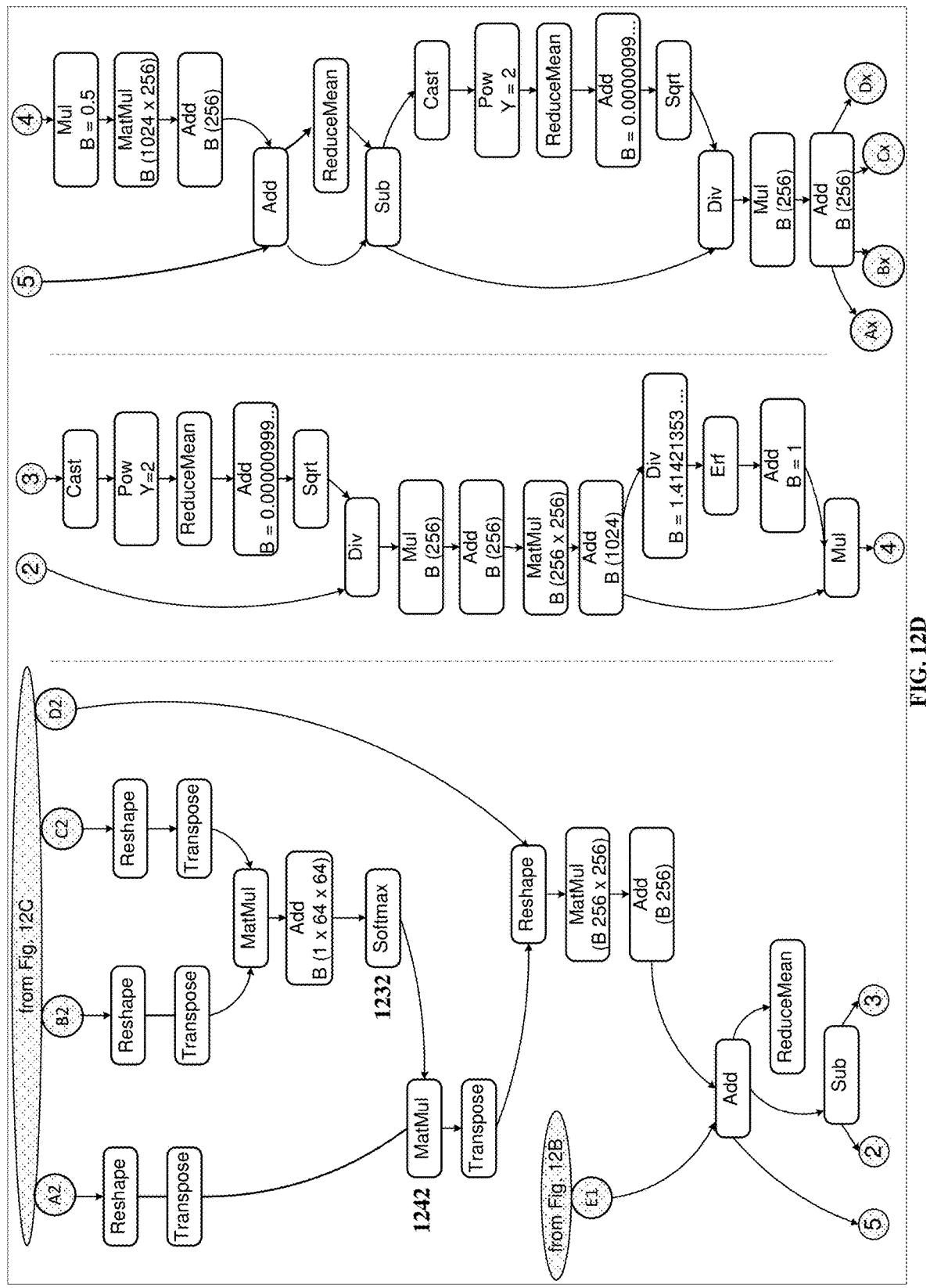

FIG. 12B, FIG. 12C and FIG. 12D together illustrate a computation dataflow graph of the functionality for html encoder 664 which results in html encoding 665 which is input to phishing classifier layers 675, with the C++ code expressed in open neural network exchange (ONNX) format. In another embodiment the ONNX code can express a different programming language.

FIG. 12B shows one section of the dataflow graph in two columns, separated by a dotted line, with a connector at the bottom of the left column feeding into the top of the right column. The results at the bottom of the right column of FIG. 12B feed into FIG. 12C and FIG. 12D. FIG. 12B illustrates the input encoding and positional embedding, as shown by gather operator 1264. For input embedding 1112, a gather block gathers data of dimension 64×256 1264.

FIG. 12C illustrates a single iteration of multi-head attention 1225, showing an example of a dataflow graph with compute nodes that asynchronously transmit data along data connections. The dataflow graph represents the so-called multi-head attention module of the Transformer model. In one embodiment, the dataflow graph shows a plurality of loops executing in parallel as separate processing pipelines to process input tensors across the plurality of processing pipelines, with a loop nest in which loops are arranged in a hierarchy of levels, such that a loop at a second level is within a loop at a first level, with gather and unsqueeze and concat operations. Gather operations (3 overall) refer to the use of the Query, Key and Value vectors in the multi-head attention layer. In this disclosed example of the model, two heads were utilized, resulting in concat operations for each of these vectors. In the illustrated embodiment, respective outputs of each of the processing pipelines are concatenated to produce concatenated outputs A2, B2, C2, D2. Outputs from the multi-head attention functionality feed into add and normalize and feedforward, as illustrated by A2, B2, C2, D2 at the bottom of FIG. 12C, and at the top of FIG. 12D.

FIG. 12D shows the add and normalize and feedforward 1245 functionality using ONNX operations. FIG. 12D is illustrated using three columns, separated by dotted lines, with the connector at the bottom of the left column feeding into the top of the middle column, and connectors at the bottom of the middle column feeding into the right column operations. Outputs of multi-head attention (shown in FIG. 12C) feed into the add and normalize and feedforward operations, and a SoftMax operation 1232 transforms the input vectors, normalizing into a probability distribution that is fed into matrix multiplier MatMul 1242. Outputs of add and normalize and feedforward 1245 Ax, Bx, Cx, Dx (shown in the bottom right corner of FIG. 12D) feed into Reduce Mean 1265 operator (FIG. 12A). Reduce Mean 1265 operator reduces over the dimensions of the input tensor (Ax, Bx, Cx, Dx), computing the mean of the input tensor's element along the provided axes. HTML encoding 665 output is a 1×256 vector 1285.

Figure 13:
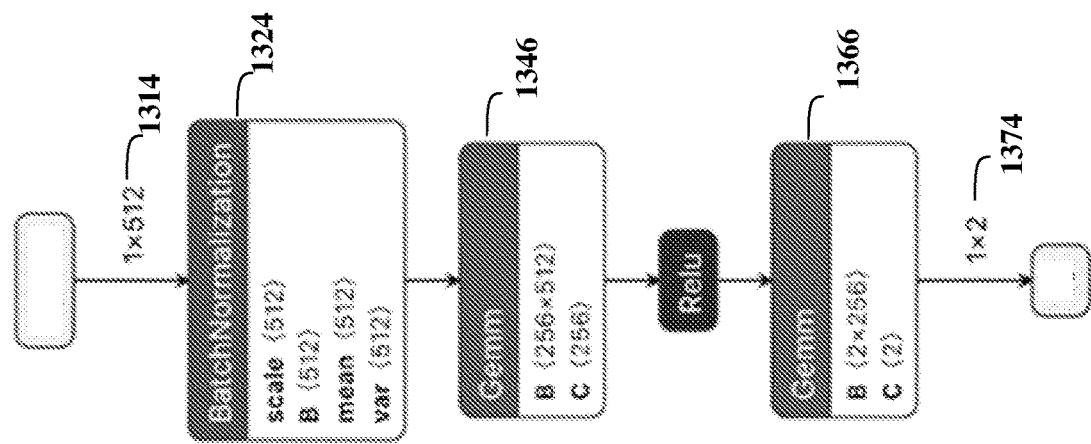
FIG. 13 illustrates a computation dataflow graph of the functionality for disclosed phishing classifier layers that generate likelihood score(s) that signal how likely it is that a specific website is a phishing website, with the code expressed in open neural network exchange (ONNX) format.

FIG. 13 illustrates a computation dataflow graph of the functionality for phishing classifier layers 675 that generate likelihood score(s) 685 that signal how likely it is that a specific website is a phishing website, with the C++ code expressed in open neural network exchange (ONNX) format. The input to phishing classifier layers 675 is of size 1×512 1314 formed by concatenating the URL embedding and the HTML encoding. The two concatenated vectors are 1×256 vector HTML encoding and URL embedding with dimension 1×32×8 (1×256), as described earlier. Batch normalization 1324 standardizes the inputs, as applied to the activations of the prior layer, and accelerates training. Operator GEneral Matrix Multiplication (GEMM) 1346, 1366 represents a linear algebra routine-a fundamental operator in DL. The outputs of the final two-layer feed forward classifier, size 1×2 1374, are the likelihood that the web page is a phishing site, and the likelihood that the web page is not a phishing site, for classifying the site as phishing or not phishing.

Computer System

Figure 14:
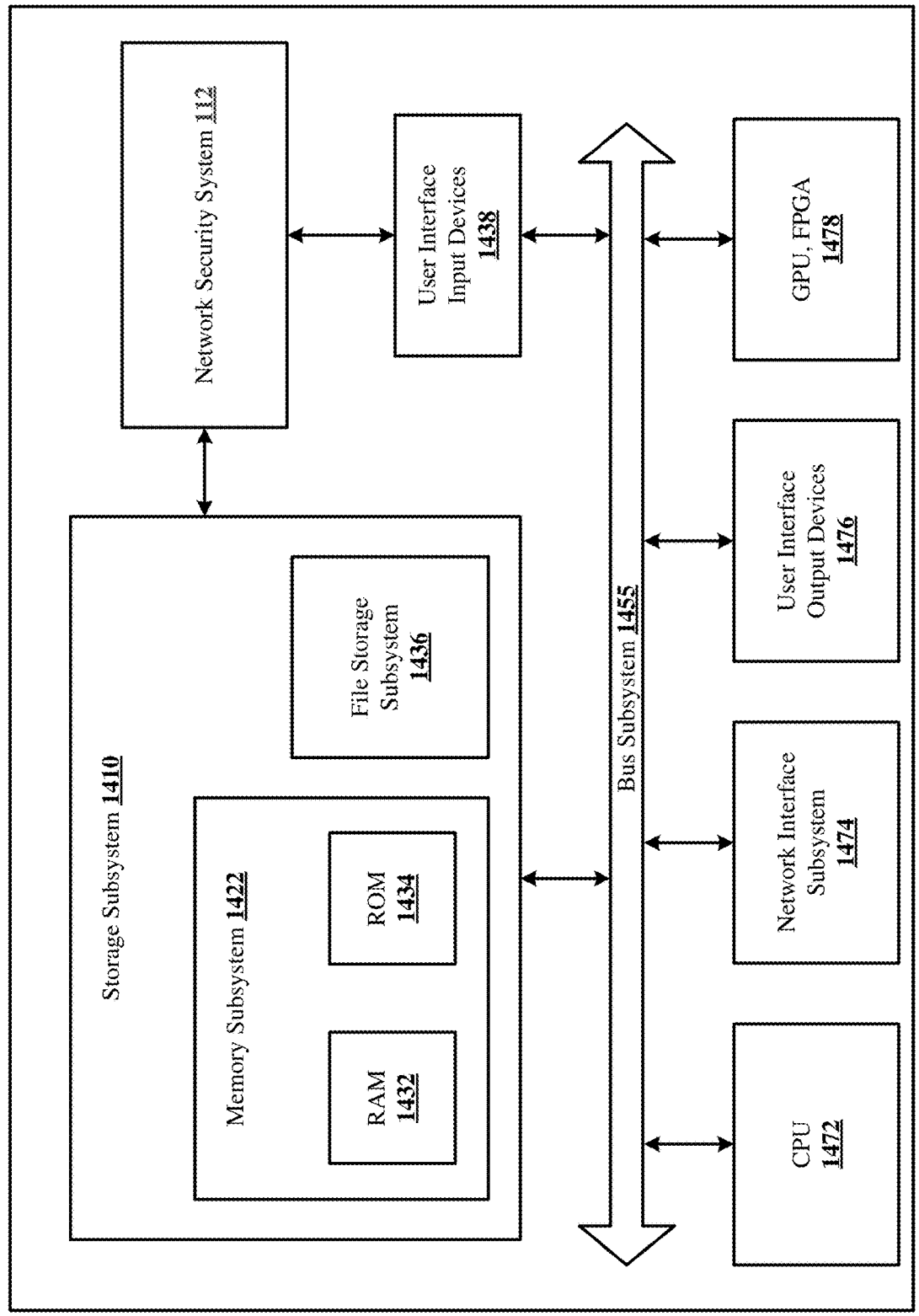
FIG. 14 is a simplified block diagram of a computer system that can be used for classifying a URL and a content page accessed via the URL as phishing or not phishing, in accordance with an implementation of the disclosed technology.

FIG. 14 is a simplified block diagram of a computer system 1000 that can be used for classifying a URL and the content page accessed via the URL as phishing or not phishing. Computer system 1400 includes at least one central processing unit (CPU) 1472 that communicates with a number of peripheral devices via bus subsystem 1455, and network security system 112 for providing network security services described herein. These peripheral devices can include a storage subsystem 1410 including, for example, memory devices and a file storage subsystem 1436, user interface input devices 1438, user interface output devices 1476, and a network interface subsystem 1474. The input and output devices allow user interaction with computer system 1400. Network interface subsystem 1474 provides an interface to outside networks, including an interface to corresponding interface devices in other computer systems.

In one implementation, cloud-based security system 153 of FIG. 1 is communicably linked to the storage subsystem 1410 and the user interface input devices 1438.

User interface input devices 1438 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1400.

User interface output devices 1476 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1400 to the user or to another machine or computer system.

Storage subsystem 1410 stores programming and data constructs that provide the functionality of some or all of the modules and methods described herein. Subsystem 1478 can be graphics processing units (GPUs) or field-programmable gate arrays (FPGAs).

Memory subsystem 1422 used in the storage subsystem 1410 can include a number of memories including a main random access memory (RAM) 1432 for storage of instructions and data during program execution and a read only memory (ROM) 1434 in which fixed instructions are stored. A file storage subsystem 1436 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1436 in the storage subsystem 1410, or in other machines accessible by the processor.

Bus subsystem 1455 provides a mechanism for letting the various components and subsystems of computer system 1400 communicate with each other as intended. Although bus subsystem 1455 is shown schematically as a single bus, alternative implementations of the bus subsystem can use multiple busses.

Computer system 1400 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 1400 depicted in FIG. 14 is intended only as a specific example for purposes of illustrating the preferred embodiments of the present invention. Many other configurations of computer system 1400 are possible having more or fewer components than the computer system depicted in FIG. 14.

Particular Implementations

Some particular implementations and features for classifying a URL and content accessed via the URL as phishing or not phishing are described in the following discussion.

In one disclosed implementation, a phishing classifier that classifies a URL and content accessed via the URL as phishing or not phishing includes a URL feature hasher that parses the URL into features and hashes the features to produce URL feature hashes, and a headless browser configured to extract words from a rendered content page and capture an image of at least part of the rendered content page. The disclosed implementation also includes a natural language encoder that produces a word encoding of the extracted words, an image embedder that produces an image embedding of the captured image, and phishing classifier layers that process a concatenated input of the URL feature hashes, the word encoding and the image embedding, to produce at least one likelihood score that the URL and the content accessed via the URL presents a phishing risk.

In another disclosed implementation, a phishing classifier that classifies a URL and content accessed via the URL as phishing or not phishing includes a URL feature hasher that parses the URL into features and hashes the features to produce URL feature hashes, and a headless browser configured to access content at the URL and internally render a content page, extract words from the rendering of the content page, and capture an image of at least part of the rendering of the content page. The disclosed implementation also includes a natural language encoder, pretrained on natural language, that produces a word encoding of the words extracted from the content page, and an image embedder, pretrained on images, that produces an image embedding of the image captured from the content page. The implementation further includes phishing classifier layers trained on the URL feature hashes, the word encoding, and the image embedding of example URLs, each example URL accompanied by a ground truth classification as phishing or as not phishing, that process a concatenated input of the URL feature hashes, the word encoding, and the image embedding of the URL to produce at least one likelihood score that the URL and the content accessed via the URL presents a phishing risk.

For some disclosed implementations of the phishing classifier, the natural language encoder is one of Bidirectional Encoder Representations from Transformers (abbreviated BERT) and Universal Sentence Encoder. The image embedder is one of residual neural network (abbreviated ResNet), Inception-v3 and VGG-16.

In one implementation, a disclosed computer-implemented method of classifying a URL and content accessed via the URL as phishing or not phishing includes applying a URL feature hasher, extracting features from the URL and hashing the features to produce URL feature hashes. The disclosed method also includes applying a natural language encoder, pretrained on natural language, that produces a word encoding of words parsed from a rendering of the content, and applying an image encoder, pretrained on images, that produces an image embedding of an image captured from at least part of the rendering. The disclosed method further includes applying phishing classifier layers trained on concatenations of the URL feature hashes, the word encoding, and the image embedding for example URLs accompanied by ground truth classifications as phishing or as not phishing, and processing the URL feature hashes, the word encoding, and the image embedding to produce at least one likelihood score that the URL and the content accessed via the URL presents a phishing risk.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

One disclosed computer-implemented method further includes applying a headless browser for accessing the content via the URL and internally rendering the content, parsing words from the rendered content, and capturing an image of at least part of the rendered content.

One embodiment of the disclosed computer-implemented method includes the natural language encoder as one of Bidirectional Encoder Representations from Transformers (BERT) and Universal Sentence Encoder. Some embodiments of the disclosed computer-implemented method also include the image embedder as one of residual neural network (ResNet), Inception-v3 and VGG-16.

One disclosed computer-implemented method of training phishing classifier layers to classify a URL and content accessed via the URL as phishing or not phishing includes receiving and processing for example URLs, URL feature hashes, a word encoding of words extracted from the content page, and an image embedding of an image captured from rendering of the content, to produce at least one likelihood score that each example URL and the content accessed via the URL presents a phishing risk. The method also includes calculating a difference between the likelihood score for each example URL and each corresponding ground truth that the example URL and the content page are phishing or not phishing and using differences for the example URLs to train coefficients of the phishing classifier layers. The method further includes saving the trained coefficients for use classifying a production URL and a content page accessed via the production URL as phishing or not phishing.

The disclosed computer-implemented method further includes not backpropagating the differences beyond the phishing classifier layers to encoding layers used to produce the word encoding, and not backpropagating the differences beyond the phishing classifier layers to embedding layers used to produce the image embedding.

The disclosed computer-implemented method also includes producing the URL feature hashes for each of the example URLs, producing the word encoding of words extracted from a rendering of the content page, and producing the image embedding of the image captured from the rendering.

For many disclosed computer-implementations, the disclosed method of training phishing classifier layers to classify a URL and content accessed via the URL as phishing or not phishing includes producing the word encoding using a Bidirectional Encoder Representations from Transformers (BERT) encoder or a variation on a BERT encoder, and producing the image embedding using one of a residual neural network (ResNet), Inception-v3 and VGG-16.

In one disclosed implementation, a phishing classifier that classifies a URL and content accessed via the URL as phishing or not phishing includes a URL feature hasher that parses the URL into features and hashes the features to produce URL feature hashes, and a headless browser configured to extract HTML tokens from a rendered content page and capture an image of at least part of the rendered content page. The disclosed classifier also includes an HTML encoder that produces an HTML encoding of the extracted HTML tokens, an image embedder that produces an image embedding of the captured image, and phishing classifier layers that process the URL feature hashes, HTML encodings and image embeddings to produce at least one likelihood score that the URL and the content accessed via the URL presents a phishing risk. In some implementations, the HTML tokens belong to a recognized vocabulary of HTML tokens.

In one implementation, a disclosed phishing classifier that classifies a URL and a content page accessed via the URL as phishing or not phishing, includes a URL feature hasher that parses the URL into features and hashes the features to produce URL feature hashes, and a headless browser configured to access content at the URL and internally render a content page, extract HTML tokens from the content page, and capture an image of at least part of the rendering of the content page. The disclosed phishing classifier also includes an HTML encoder, trained on HTML tokens extracted from content pages at example URLs, encoded, then decoded to reproduce images captured from rendering of the content pages, that produces an HTML encoding of the HTML tokens extracted from the content page. Also included is an image embedder, pretrained on images, that produces an image embedding of the image captured from the content page, and phishing classifier layers, trained on the URL feature hashes, the HTML encoding, and the image embedding of example URLs, each example URL accompanied by a ground truth classification as phishing or as not phishing, that process the URL feature hashes, HTML encoding and image embeddings of the URL to produce at least one likelihood score that the URL and the content page accessed via the URL presents a phishing risk.

Some implementations of the disclosed method further include the headless browser configured to extract from the content the HTML tokens that belong to a predetermined token vocabulary and ignore portions of the content that do not belong to the predetermined token vocabulary. Some disclosed implementations further include the headless browser configured to extract for production of HTML encodings of up to 64 of the HTML tokens.

One implementation of a disclosed method of classifying a URL and a content page accessed via the URL as phishing or not phishing includes applying a URL feature hasher, extracting features from the URL and hashing the features to produce URL feature hashes. The method also includes applying an HTML encoder, trained on natural language, that produces an HTML encoding of HTML tokens extracted from a rendered content page. The method further includes an image embedder, pretrained on images, that produces an image embedding of an image captured from at least part of the rendered content page, and applying phishing classifier layers trained on the URL feature hashes, the HTML encoding, and the image embedding for example URLs classified accompanied by ground truth classifications as phishing or as not phishing, and processing the URL feature hashes, the HTML encoding, and the image embedding of the URL, to produce at least one likelihood score that the URL and the content accessed via the URL presents a phishing risk. In one disclosed implementation, the method further includes applying a headless browser, accessing the content page via the URL and internally rendering the content page, parsing HTML tokens from the rendered content, and capturing an image of at least part of the rendered content.

Some disclosed implementations further include the headless browser parsing from the content the HTML tokens that belong to a predetermined token vocabulary and ignoring portions of the content that do not belong to the predetermined token vocabulary. Some implementations also include the headless browser parsing up to 64 of the HTML tokens for production of HTML encodings.

One implementation of a disclosed computer-implemented method of training phishing classifier layers to classify a URL and a content page accessed via the URL as phishing or not phishing includes receiving and processing for example URLs, URL feature hashes, HTML encodings of HTML tokens extracted from the content page, and an image embedding of an image captured from a rendering of the content page, to produce at least one likelihood score that each example URL and the content accessed via the URL presents a phishing risk. The method includes calculating a difference between the likelihood score for each example URL and each corresponding ground truth as to whether the example URL and the content page are phishing or not phishing, using the calculated differences for the example URLs to train coefficients of the phishing classifier layers, and saving the trained coefficients for use classifying a production URL and a content page accessed via the production URL as phishing or not phishing.

Some implementations of the disclosed method include back-propagating the differences beyond the phishing classifier layers to encoding layers used to produce the HTML encodings. Some implementations further include not back-propagating the differences beyond the phishing classifier layers to embedding layers used to produce the image embedding.

Some implementations also include producing the URL feature hashes for each of the example URLS, producing the HTML encoding of HTML tokens extracted from a rendering the content page, and producing the image embedding of the image captured from the rendering. Some implementations further include training an HTML encoder-decoder to produce the HTML encodings using, for second example URLs, HTML tokens extracted from content pages of the second example URLs, encoded then decoded to reproduce images captured from the content pages of the second example URLs. Some implementations of the disclosed method also include producing the image embedding using a ResNet embedder or a variation on a ResNet embedder that is pretrained to embed images in an embedding space.

One implementation of a disclosed phishing classifier that classifies a URL and a content page accessed via the URL as phishing or not phishing includes an input processor that accepts a URL for classification, a URL embedder that produces a URL embedding of the URL, an HTML parser that extracts HTML tokens from a content page accessed via the URL, an HTML encoder that produces an HTML encoding from the HTML tokens, and a phishing classifier layer that operates on the URL embedding and the HTML encoding to classify the URL and content accessed via the URL as phishing or not phishing.

Some implementations of the disclosed phishing classifier also include a URL embedder that extracts characters in a predetermined character set from the URL to produce a character string and that is trained using a ground truth classification of the URL as phishing or as not phishing, that produces a URL embedding. The classifier further includes an HTML parser configured to access content at the URL and extract HTML tokens from the content page. Also included are a disclosed HTML encoder trained on HTML tokens extracted from content pages at example URLs, each example URL accompanied by a ground truth image captured from the content page accessed via the example URL, that produces an HTML encoding of the HTML tokens extracted from the content page, and phishing classifier layers trained on the URL embedding and the HTML encoding of example URLs, each example URL accompanied by the ground truth classification as phishing or as not phishing, that processes a concatenated input of the URL embedding and the HTML encoding to produce at least one likelihood score that the URL and the content accessed via the URL presents a phishing risk.

For some implementations of the disclosed phishing classifier, the input processor accepts the URL for classification in real time. In many implementations of the disclosed phishing classifier the phishing classifier layer operates to classify the URL and content accessed via the URL as phishing or not phishing in real time. In some implementations, the disclosed phishing classifier further includes the HTML parser configured to extract from the content page the HTML tokens that belong to a predetermined token vocabulary and ignore portions of the content page that do not belong to the predetermined token vocabulary, and can further include the HTML parser configured to extract for production of HTML encodings of up to 64 of the HTML tokens.

One implementation of a disclosed computer-implemented method of classifying a URL and a content page accessed via the URL as phishing or not phishing includes applying a URL embedder, extracting characters in a predetermined character set from the URL to produce a character string and producing a URL embedding, and training and using a ground truth classification of the URL as phishing or as not phishing, that produces a URL embedding. The method also includes applying an HTML parser to access content at the URL and extract HTML tokens from the content page, applying an HTML encoder to produce an HTML encoding of the extracted HTML tokens, and applying phishing classifier layers to a concatenated input of the URL embedding and the HTML encoding, to produce at least one likelihood score that the URL and the content accessed via the URL presents a phishing risk. Some implementations also include the HTML parser extracting from the content page the HTML tokens that belong to a predetermined token vocabulary and ignoring portions of the content page that do not belong to the predetermined token vocabulary, and can further include. the HTML parser extracting for production of HTML encodings of up to 64 of the HTML tokens. The disclosed method can also include applying the URL embedder, the HTML parser, the HTML encoder and the phishing classifier layers in real time. In some cases the phishing classifier layers operate to produce at least one likelihood score that the URL and the content accessed via the URL presents a phishing risk in real time.

One implementation of a disclosed computer-implemented method of training phishing classifier layers to classify a URL and a content page accessed via the URL as phishing or not phishing includes receiving and processing for example URLs and content pages accessed via the URLs, a URL embedding of characters extracted from the URLs and HTML encodings of HTML tokens extracted from the content pages, to produce at least one likelihood score that each example URL and the content page accessed via the URL presents a phishing risk. The disclosed method also includes calculating a difference between the likelihood score for each example URL and each corresponding ground truth that the example URL and the content page are phishing or not phishing, using differences for the example URLs to train coefficients of the phishing classifier layers, and saving the trained coefficients for use classifying a production URL and a content page accessed via the production URL as phishing or not phishing.

Some implementations of the disclosed method further include applying a headless browser, accessing content at the URL and internally rendering a content page, and capturing an image of at least part of the content page. The disclosed method can further include back-propagating the differences beyond the phishing classifier layers to encoding layers used to produce the HTML encodings, and can further include back-propagating the differences beyond the phishing classifier layers to embedding layers used to produce the URL embedding.

Some implementations of the disclosed method further include producing the URL embeddings of the characters extracted from the example URLs, and producing the HTML encodings of HTML tokens extracted from the content pages accessed via the example URLs, and producing the image embedding of the image captured from the rendering.

Some implementations of the disclosed method further include training an HTML encoder-decoder to produce the HTML encodings using, for second example URLs, HTML tokens extracted from content pages of the second example URLs, encoded then decoded to reproduce images captured from the content pages of the second example URLs. The disclosed method can further include extracting from the content page the HTML tokens that belong to a predetermined token vocabulary and ignoring portions of the content page that do not belong to the predetermined token vocabulary. The method can also include limiting the extraction to a predetermined number of the HTML tokens, and can further include producing HTML encodings of up to 64 of the HTML tokens.

Other implementations of the methods described in this section can include a tangible non-transitory computer readable storage medium impressed with computer program instructions that, when executed on processors cause the processors to perform any of the methods described above. Yet another implementation of the methods described in this section can include a device including memory and one or more processors operable to execute computer instructions, stored in the memory, to perform any of the methods described above.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A phishing classifier including:
   a URL embedder running on a hardware processor that extracts characters in a predetermined character set from the URL to produce a character string and that is trained using a ground truth classification of the URL as phishing or as not phishing, that produces a URL embedding;
   an HTML parser configured to
      access a content page at the URL;
      extract from the content page HTML tokens that belong to a predetermined token vocabulary and ignore portions of the content page that do not belong to the predetermined token vocabulary;
   an HTML encoder
      trained on HTML tokens extracted from content pages at example URLs, each example URL accompanied by a ground truth image captured from the content page accessed via the example URL,
      that produces an HTML encoding of the HTML tokens extracted from the content page; and
   phishing classifier layers,
      trained on the URL embedding and the HTML encoding of example URLs, each example URL accompanied by a ground truth classification as phishing or as not phishing,
      that processes a concatenated input of the URL embedding and the HTML encoding to produce at least one likelihood score that the URL and the content accessed via the URL presents a phishing risk.

2. The phishing classifier of claim 1, further including an input processor that accepts the URL for classification in real time.

3. The phishing classifier of claim 1, wherein the phishing classifier layers operate to classify the URL and content accessed via the URL as phishing or not phishing in real time.

4. The phishing classifier of claim 1, further including the HTML parser configured to extract for production of HTML encodings of up to 64 of the HTML tokens.

5. A computer-implemented method of classifying a URL and a content page accessed via the URL as phishing or not phishing, including:
   applying a URL embedder, extracting characters in a predetermined character set from the URL to produce a character string and producing a URL embedding, and training and using a ground truth classification of the URL as phishing or as not phishing, that produces a URL embedding;
   applying an HTML parser to access a content page at the URL and extract from the content page HTML tokens that belong to a predetermined token vocabulary and ignore portions of the content page that do not belong to the predetermined token vocabulary;
   applying an HTML encoder to produce an HTML encoding of the extracted HTML tokens; and
   applying phishing classifier layers to a concatenated input of the URL embedding and the HTML encoding, to produce at least one likelihood score that the URL and the content page accessed via the URL presents a phishing risk.

6. The computer-implemented method of claim 5, further including the HTML parser extracting for production of HTML encodings of up to 64 of the HTML tokens.

7. The computer-implemented method of claim 5, further including applying the URL embedder, the HTML parser, the HTML encoder and the phishing classifier layers in real time.

8. The computer-implemented method of claim 5, wherein the phishing classifier layers operate to produce at least one likelihood score that the URL and the content accessed via the URL presents a phishing risk in real time.

9. A non-transitory computer readable storage medium impressed with computer program instructions for classifying a URL and a content page accessed via the URL as phishing or not phishing, the instructions, when executed on a processor, implement actions comprising:
   applying a URL embedder, extracting characters in a predetermined character set from the URL to produce a character string and producing a URL embedding;
   applying an HTML parser to extract from the content page HTML tokens that belong to a predetermined token vocabulary and ignore portions of the content page that do not belong to the predetermined token vocabulary;
   applying an HTML encoder to produce an HTML encoding of the extracted HTML tokens; and
   applying phishing classifier layers to a concatenated input of the URL embedding and the HTML encoding, to produce at least one likelihood score that the URL and the content page accessed via the URL presents a phishing risk.

10. The non-transitory computer readable storage medium of claim 9, the instructions, when executed on a processor, implement the actions further including the HTML parser extracting from the content page the HTML tokens that belong to a predetermined token vocabulary and ignoring portions of the content page that do not belong to the predetermined token vocabulary.

11. The non-transitory computer readable storage medium of claim 9, the instructions, when executed on a processor, implement the actions further including the HTML parser extracting for production of HTML encodings of up to 64 of the HTML tokens.

12. The non-transitory computer readable storage medium of claim 9, the instructions, when executed on a processor, implement the actions further including training the HTML encoder on HTML tokens extracted from content pages at example URLs, each example URL accompanied by a ground truth image captured from the content page accessed via the example URL.

13. The non-transitory computer readable storage medium of claim 9, the instructions, when executed on a processor, implement the actions further including training the phishing classifier layers on the URL embedding and the HTML encoding of example URLs, each example URL accompanied by a ground truth classification as phishing or as not phishing.

14. A computer-implemented method of training phishing classifier layers to classify a URL and a content page accessed via the URL as phishing or not phishing, including:
   receiving and processing for example URLs and content pages accessed via the URLs,
      a URL embedding of characters extracted from the URLs and HTML encodings of HTML tokens extracted from the content pages,
      to produce at least one likelihood score that each example URL and corresponding content page accessed via the URL presents a phishing risk;
   calculating a difference between the likelihood score for each example URL and each corresponding ground truth that the example URL and the content page are phishing or not phishing;
   using differences for the example URLs to train coefficients of the phishing classifier layers, encoding layers and embedding layers by back-propagation; and
   saving the trained coefficients for use classifying a production URL and a content page accessed via the production URL as phishing or not phishing.

15. The computer-implemented method of claim 14, further including:
   applying a headless browser,
      accessing content at the URL and internally rendering a content page; and
      capturing an image of at least part of the content page.

16. The computer-implemented method of claim 15, further including:
   producing the URL embeddings of the characters extracted from the example URLs; and
   producing the HTML encodings of HTML tokens extracted from the content pages accessed via the example URLs, and producing the image embedding of the image captured from the rendering.

17. The computer-implemented method of claim 15, further including training an HTML encoder-decoder to produce the HTML encodings using, for second example URLs, HTML tokens extracted from content pages of the second example URLs, encoded then decoded to reproduce images captured from the content pages of the second example URLs.

18. The computer-implemented method of claim 14, further including extracting from the content page the HTML tokens that belong to a predetermined token vocabulary and ignoring portions of the content page that do not belong to the predetermined token vocabulary.

19. The computer-implemented method of claim 18, further including limiting the extraction to a predetermined number of the HTML tokens.

20. The computer-implemented method of claim 18, further including producing HTML encodings of up to 64 of the HTML tokens.

* * * * *